United States Patent
Zhang et al.

(10) Patent No.: US 12,096,423 B2
(45) Date of Patent: Sep. 17, 2024

(54) METHODS AND SYSTEMS FOR CHANNEL STATE ACQUISITION WITH SELF-INTERFERENCE IN FULL DUPLEX SYSTEMS

(71) Applicants: Xi Zhang, Kanata (CA); Jianglei Ma, Ottawa (CA)

(72) Inventors: Xi Zhang, Kanata (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 157 days.

(21) Appl. No.: 17/088,908

(22) Filed: Nov. 4, 2020

(65) Prior Publication Data
US 2022/0141852 A1    May 5, 2022

(51) Int. Cl.
*H04W 72/1268*    (2023.01)
*H04L 5/14*    (2006.01)
*H04L 25/02*    (2006.01)

(52) U.S. Cl.
CPC .......... *H04W 72/1268* (2013.01); *H04L 5/14* (2013.01); *H04L 25/0202* (2013.01)

(58) Field of Classification Search
None
See application file for complete search history.

(56) References Cited

U.S. PATENT DOCUMENTS

| | | | |
|---|---|---|---|
| 2013/0044621 A1* | 2/2013 | Jung | H04J 11/005 370/336 |
| 2016/0143013 A1* | 5/2016 | Kim | H04L 27/2607 370/329 |
| 2019/0260485 A1* | 8/2019 | Byun | H04W 76/15 |
| 2020/0220585 A1* | 7/2020 | John Wilson | H04B 7/0626 |
| 2021/0194564 A1* | 6/2021 | Xu | H04L 5/1461 |

(Continued)

FOREIGN PATENT DOCUMENTS

| | | |
|---|---|---|
| CN | 109151886 A | 1/2019 |
| WO | 2018219068 A1 | 12/2018 |

(Continued)

OTHER PUBLICATIONS

R1-1705133, Panasonic, Discussion on CSI measurement for duplex flexibility in NR, 3GPP TSG RAN WG1 Meeting #88bis, Spokane, USA, Apr. 3-7, 2017, total 2 pages.

(Continued)

*Primary Examiner* — Liem H. Nguyen

(57) ABSTRACT

Some aspects of the present disclosure enable a network to account for impacts of digital transmit and receive precoding at the user equipment (UE) side in the presence of UE self-interference that may occur during full duplex (FD) operation. Some aspects of the present disclosure include joint downlink (DL) node selection or beam selection, or both, and UE self-interference emulation, so that the UE is enabled with FD operation that includes receiving from one node, but transmitting towards another node. When compared with the case where the UE receives from, and transmits, to a same node, because when two separate nodes are involved and the two nodes are more physically separated, the chance of achieving higher cross-link isolation, and hence FD transmission, is higher.

20 Claims, 14 Drawing Sheets

(56) References Cited

U.S. PATENT DOCUMENTS

| | | | | |
|---|---|---|---|---|
| 2021/0329473 | A1* | 10/2021 | Zhang | H04B 7/0874 |
| 2021/0345399 | A1* | 11/2021 | Levy | H04L 5/0073 |
| 2021/0351832 | A1* | 11/2021 | Zhang | H04B 7/0695 |
| 2021/0351838 | A1* | 11/2021 | Zhang | H04L 5/0023 |
| 2021/0352510 | A1* | 11/2021 | Zhang | H04L 1/189 |
| 2022/0022206 | A1* | 1/2022 | Ibrahim | H04B 17/345 |
| 2022/0069884 | A1* | 3/2022 | Zhang | H04B 17/318 |
| 2022/0086658 | A1* | 3/2022 | Zhang | H04L 5/0051 |
| 2022/0109550 | A1* | 4/2022 | Bai | H04L 5/16 |
| 2022/0110068 | A1* | 4/2022 | Bai | H04W 52/42 |
| 2022/0247468 | A1* | 8/2022 | Huang | H04W 24/08 |
| 2022/0329308 | A1* | 10/2022 | Huang | H04B 7/0626 |
| 2023/0118279 | A1* | 4/2023 | Huang | H04B 17/24 370/329 |
| 2023/0179279 | A1* | 6/2023 | Huang | H04L 5/0051 370/252 |

FOREIGN PATENT DOCUMENTS

| | | | | |
|---|---|---|---|---|
| WO | WO-2020173286 | A1 * | 9/2020 | H04L 1/0023 |
| WO | WO-2020249119 | A1 * | 12/2020 | H04L 5/0057 |
| WO | WO-2020253585 | A1 * | 12/2020 | H04B 7/0404 |
| WO | WO-2021223059 | A1 * | 11/2021 | |

OTHER PUBLICATIONS

RP-190265, LG Electronics, Motivation for new SI: Study on Flexible and Full Duplex for NR, 3GPP TSG RAN Meeting #83, Shenzhen, China, Mar. 18-21, 2019, total 10 pages.

"3rd Generation Partnership Project; Technical Specification Group Radio Access Network; NR; Physical channels and modulation" (Release 16), Technical Specification, 3GPP TS 38.211 V16.1.0, Mar. 2020, 130 pages.

Gazestani, Amirhosein Hajihoseini, et al., "A Survey on Implementation and Applications of Full Duplex Wireless Communications", Physical Communication, Jun. 2019, vol. 34, pp. 121-134.

Kolodziej, Kenneth E., et al., "In-Band Full-Duplex Technology: Techniques and Systems Survey", IEEE Transactions on Microwave Theory and Techniques, Jul. 2019, vol. 67, No. 7, pp. 3025-3041.

* cited by examiner

| TPMI index | $W$ (ordered from left to right in increasing order of TPMI index) | | | | | |
|---|---|---|---|---|---|---|
| 0 – 5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ |

FIG. 7

| TPMI index | $W$ (ordered from left to right in increasing order of TPMI index) | | |
|---|---|---|---|
| 0 – 2 | $\frac{1}{\sqrt{2}}\begin{bmatrix}1 & 0\\0 & 1\end{bmatrix}$ | $\frac{1}{2}\begin{bmatrix}1 & 1\\1 & -1\end{bmatrix}$ | $\frac{1}{2}\begin{bmatrix}1 & 1\\j & -j\end{bmatrix}$ |

FIG. 8

```
TRI-TPMI-subset ::=
{
    TRI=ENUMERATED{n1,n2},
    TPMI=bitstring(31),
}
```

FIG. 9

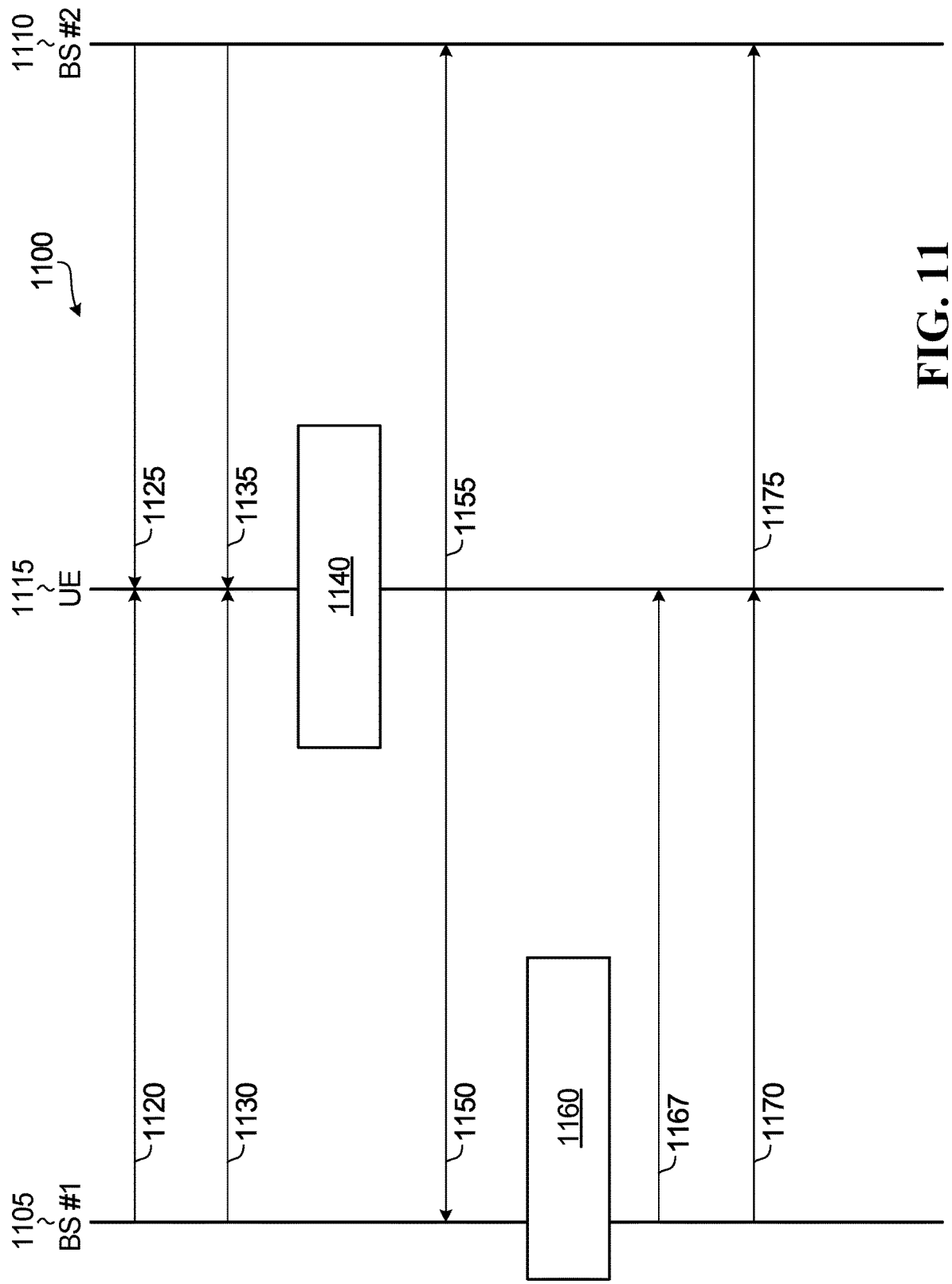

METHODS AND SYSTEMS FOR CHANNEL STATE ACQUISITION WITH SELF-INTERFERENCE IN FULL DUPLEX SYSTEMS

TECHNICAL FIELD

The present disclosure relates generally to wireless communications, and in particular embodiments, methods to obtain channel state information (CSI) with self-interference in full duplex systems.

BACKGROUND

In some wireless communication systems, user equipments (UEs) wirelessly communicate with a base station to send data to the base station and/or receive data from the base station. A wireless communication from a UE to a base station is referred to as an uplink (UL) communication. A wireless communication from a base station to a UE is referred to as a downlink (DL) communication. A wireless communication from a first UE to a second UE is referred to as a sidelink (SL) communication or device-to-device (D2D) communication. A wired or wireless communication from a first base station to a second base station is referred to as a backhaul communication.

Resources are required to perform uplink, downlink and sidelink communications. For example, a base station may wirelessly transmit data, such as a transport block (TB), to a UE in a downlink transmission at a particular frequency and over a particular duration of time. The frequency and time duration used are examples of resources.

In a half-duplex communication system, a transceiver stops receiving while transmitting or stops transmitting while receiving. In a full duplex (FD) communication system, transceivers communicate with each other at the same time, reducing the latency of two-way communications. Some FD schemes allow the transceivers to transmit and receive over different frequency bandwidth, which effectively reduces or eliminates the interference between two parallel links (e.g., from point A to point B, from point B to point A). Some other FD schemes pursue simultaneous bi-directional communication over the same frequency bandwidth and hence provide improved spectrum utilization. The FD schemes over the same or overlapped frequency bandwidth need effective mitigation of self-interference (between the transmitter and receiver of the transceiver).

SUMMARY

Some aspects of the present disclosure enable a network to account for impacts of digital transmit and receive precoding at the UE side in the presence of UE self-interference that may occur during FD operation.

Some aspects of the present disclosure include joint DL node selection or beam selection, or both, and UE self-interference emulation, so that the UE is enabled with FD operation that includes receiving from one node, but transmitting towards another node. When compared with the case where the UE receives from, and transmits to, a same node, because when two separate nodes are involved and the two nodes are more physically separated, the chance of achieving higher cross-link isolation, and hence FD transmission, is higher.

The terms cross-UE interference and UE cross interference maybe used interchangeably in the document to mean interference that occurs between transmit and receive beams or antennas of neighboring UEs. Furthermore, self-interference and self-isolation that are each referred to in this document generally refer to a similar aspect of how much interference occurs between transmit and receive beams or antennas of a same network element such as transmit and receive beams or antennas of a UE or transmit and receive beams or antennas of a base station. When self-interference is used, it refers to the amount or level of interference. When self-isolation is used, it refers the level of isolation, reflecting the amount or level of interference but in a different measuring direction. For example, when self-interference is high, the self-solation is deemed relatively low; when self-interference is low, the self-isolation is deemed relatively high. Therefore, when one expression is used, it is to be understood that the other term may also apply.

According to an aspect of the disclosure, there is provided a method that includes receiving, by a user equipment (UE), configuration information comprising an identification of a reference signal for full-duplex channel state information (FD CSI) and FD CSI reporting information; determining, by the UE, FD CSI resulting from a received reference signal for determining FD CSI when reception is affected by hypothetical uplink (UL) transmission interference from the UE based on a reference signal for self-interfering channel estimation used by the UE; and transmitting, by the UE, information pertaining to the FD CSI according to the received FD CSI reporting information.

In some embodiments, the determining the FD CSI comprises determining information about one or more of: rank indicator (RI); channel quality indicator (CQI); or precoding matrix indicator (PMI).

In some embodiments, the method further includes: receiving, by the UE, scheduling information for FD transmissions, which includes UL transmit rank indicator (TRI) and UL transmit precoding matrix indicator (TPMI) to be used by the UE when performing an FD transmission; and performing, by the UE, an FD transmission based on the received scheduling information.

In some embodiments, each reference signal for FD CSI identified in the received configuration information corresponds to a separate network node or a separate beam, the method further involves: transmitting a reference signal for FD CSI resource indicator, by the UE, that enables identifying a preferred network node or beam for DL reception in FD mode.

In some embodiments, the identification of the reference signal for FD CSI comprises at least one of: identification of a CSI-RS associated with the corresponding reference signal for self-interfering channel estimation; identification of a set of CSI-RS associated with the corresponding reference signal for self-interfering channel estimation; identification of a CSI-RS associated with a corresponding set of reference signals for self-interfering channel estimation; or identification of at least one set of CSI-RS associated with a corresponding set of reference signals for self-interfering channel estimation.

In some embodiments, the determining the FD CSI is performed assuming at least one of: self-interference resulting from a particular UL transmit TRI applied onto the self-interfering channel obtained from the reference signal for self-interfering channel estimation; or a particular UL TPMI applied onto the self-interfering channel obtained from the reference signal for self-interfering channel estimation.

In some embodiments, the transmitting, by the UE, the information pertaining to the FD CSI includes at least one of: RI; CQI; PMI; at least one UL TRI value used to determine the FD CSI; or at least one UL TPMI value used to determine the FD CSI.

In some embodiments, the determining the FD CSI for FD is performed for multiple UL TRI and UL TPMI resulting in multiple FD CSIs corresponding to the respective UL TRI and UL TPMI values.

In some embodiments, the UL TRI and the UL TPMI used in the determining are: selected by the UE; or received by the UE from another device.

According to an aspect of the disclosure, there is provided an apparatus that includes a processor and a computer-readable medium. The computer-readable medium has stored thereon computer executable instructions, that when executed, cause the apparatus to: receive configuration information comprising an identification of a reference signal for full-duplex channel state information (FD CSI) and FD CSI reporting information; determine FD CSI resulting from a received reference signal for determining FD CSI when reception is affected by hypothetical uplink (UL) transmission interference based on a reference signal for self-interfering channel estimation used by the apparatus; and transmit information pertaining to the FD CSI according to the received FD CSI reporting information.

In some embodiments, the computer executable instructions when executed further cause the apparatus to: receive scheduling information for FD transmissions, which includes UL TRI and UL TPMI to be used by the apparatus when performing an FD transmission; and perform an FD transmission based on the received scheduling information.

In some embodiments, each reference signal for FD CSI identified in the received configuration information corresponds to a separate network node or a separate beam, and the computer executable instructions when executed further cause the apparatus to: transmit a reference signal for FD CSI resource indicator that enables identifying a preferred network node or beam for DL reception in FD mode.

According to an aspect of the disclosure, there is provided a method that includes: transmitting, by a base station, configuration information comprising an identification of a reference signal for FD CSI and FD CSI reporting information; and receiving, by the base station, information pertaining to FD CSI resulting from the transmitted reference signal for determining FD CSI when affected by hypothetical UL transmission interference from a reference signal for self-interfering channel estimation at a UE.

In some embodiments, receiving the information pertaining to the FD CSI comprises receiving information about one or more of: RI; CQI; or PMI.

In some embodiments, the method further includes: transmitting, by the base station, scheduling information for FD transmissions, which includes UL TRI and UL TPMI to be used by a UE when performing an FD transmission; and performing, by the base station, an FD transmission based on the scheduling information.

In some embodiments, each reference signal for FD CSI identified in the transmitted configuration information corresponds to a separate network node or a separate beam, the method further comprising: receiving a reference signal for FD CSI resource indicator that enables identifying a preferred network node or beam for DL reception in FD mode.

In some embodiments, the identification of the reference signal for FD CSI comprises at least one of: identification of a CSI-RS associated with the corresponding reference signal for self-interfering channel estimation; identification of a set of CSI-RS associated with the corresponding reference signal for self-interfering channel estimation; identification of a CSI-RS associated with a corresponding set of reference signals for self-interfering channel estimation; or identification of at least one set of CSI-RS associated with a corresponding set of reference signals for self-interfering channel estimation.

In some embodiments, the receiving the information pertaining to the FD CSI includes receiving at least one of: RI; CQI; PMI; at least one UL TRI value used to determine a respective FD CSI; or at least one UL TPMI value used to determine a respective FD CSI.

In some embodiments, the received information pertaining to the FD CSI comprises a particular UL TRI or a particular UL TPMI.

In some embodiments, the information pertaining to the FD CSI comprises multiple UL TRI and UL TPMI resulting in multiple FD CSIs corresponding to the respective UL TRI and UL TPMI values.

In some embodiments, the UL TRI and the UL TPMI are selected by the base station and provided to a UE being served by the base station.

According to an aspect of the disclosure, there is provided an apparatus that includes a processor and a computer-readable medium. The computer-readable medium has stored thereon computer executable instructions, that when executed, cause the apparatus to: transmit configuration information comprising an identification of a reference signal for full-duplex channel state information (FD CSI) and FD CSI reporting information; and receiving information pertaining to FD CSI resulting from the transmitted reference signal for determining FD CSI when affected by hypothetical uplink (UL) transmission interference from a reference signal for self-interfering channel estimation at a user equipment (UE).

In some embodiments, the computer executable instructions when executed further cause the apparatus to: transmit scheduling information for FD transmissions, which includes UL TRI and UL TPMI to be used by a UE when performing an FD transmission; and perform an FD transmission based on the scheduling information.

In some embodiments, each reference signal for FD CSI identified in the received configuration information corresponds to a separate network node or a separate beam, and the computer executable instructions when executed further cause the apparatus to: receive a reference signal for FD CSI resource indicator identifying a preferred network node or beam for DL reception in FD mode.

BRIEF DESCRIPTION OF THE DRAWINGS

For a more complete understanding of the present embodiments, and the advantages thereof, reference is now made, by way of example, to the following descriptions taken in conjunction with the accompanying drawings, in which:

FIGS. 7 and 8 are example tables of transmit precoding matrix indicator (TPMI) that may be used in aspects of the disclosure.

FIG. 9 is a representation of TPMI and transmit rank indicator (TRI) configuration information transmitted by a base station to a UE according to an aspect of the disclosure.

FIG. 10 is a schematic diagram of a full duplex scheme configured to determine a DL channel state information report and select one of multiple nodes that takes into consideration self-interference at the UE according to an aspect of the disclosure.

FIG. 11 is a signal flow diagram illustrating signaling between a base station and a UE to determine a DL channel state information report and select one of multiple nodes that takes into consideration self-interference at the UE according to an aspect of the disclosure.

DETAILED DESCRIPTION OF ILLUSTRATIVE EMBODIMENTS

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Figure 1A:
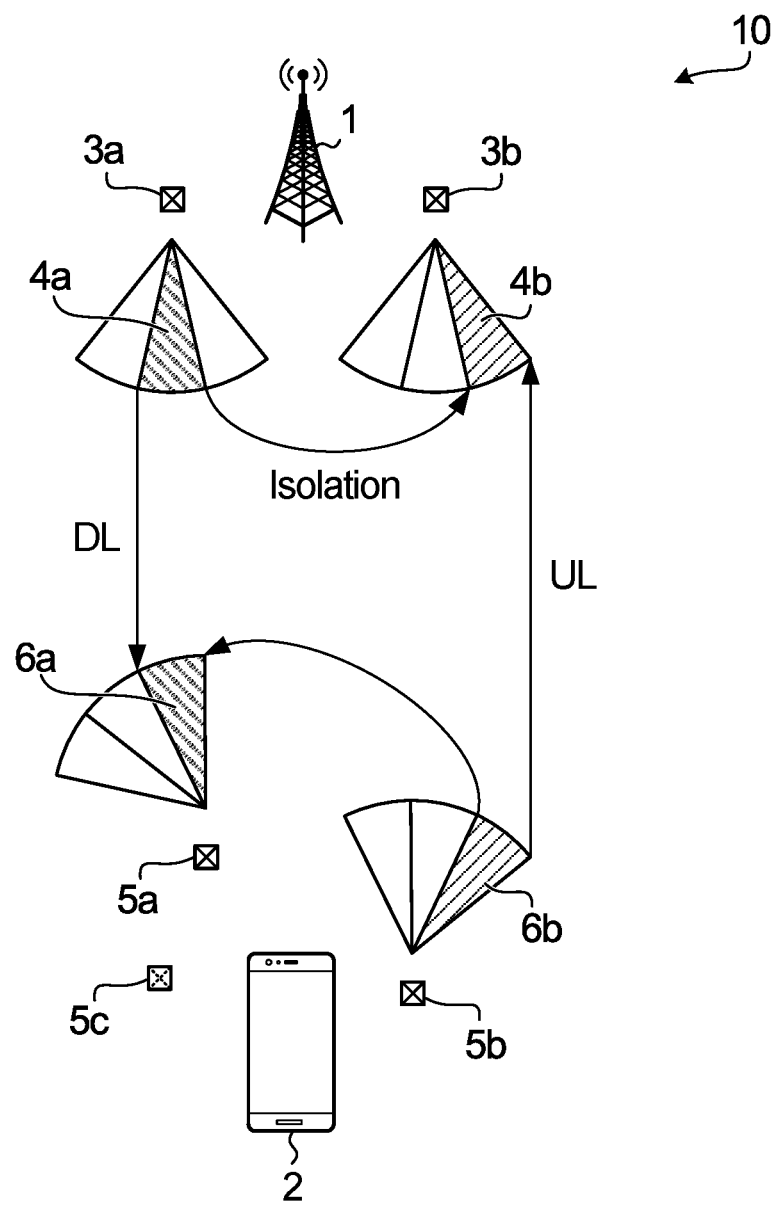
FIG. 1A is a schematic diagram of a full duplex scheme configured to provide isolation between transmit and receive beams.

There are various ways involving self-interference suppression and/or cancellation methods in both the analog and digital domains that have been studied to enable transceivers to transmit and receive simultaneously over the same frequency bandwidth. One particular method, is to apply transmit and receive beamforming, often categorized as in propagation or the analog domain. The key point of such method is to find appropriate beamforming patterns providing manageable cross-direction interference to enable simultaneous bi-directional communications. This is illustrated in FIG. 1A, where FD communication 10 is shown between one base station 1 and one UE 2. The base station 1 is shown having two antenna panels 3a, 3b that each have three beams shown covering a portion of a coverage area. The UE 2 is shown having three antenna panels 5a, 5b, 5c, two of which are shown having three beams shown covering a portion of a coverage area. One base station transmit beam and one UE receive beam is considered a beam pair and one base station receive beam and one UE transmit beam is considered a beam pair. Therefore, two pairs are needed for FD transmission, where one is used for downlink (DL) and the other is used for uplink (UL). A DL is shown to include a transmit/receive beam pair that include base station transmit beam 4a and UE receive beam 6a. A UL is shown to include a transmit/receive beam pair that include UE transmit beam 6b and base station receive beam 4b. There is some level of isolation between base station transmit beam 4a and base station receive beam 4b as these two beams are directed in different directions. There is some level of isolation between UE receive beam 6a and UE transmit beam 6b as these two beams are directed in different directions.

While the case of base station-to-UE transmission is shown as an example, the concept of FD can naturally be extended to base station-to-base station (backhaul) or UE-to-UE (sidelink) cases.

Furthermore, unless otherwise stated, it is assumed that when UEs are referred to in this description, they are FD capable UEs, that is UEs that are enabled to perform full duplex functionality. UEs that are enabled to perform full duplex functionality are also typically able to perform half duplex functionality. When UEs are indicated to be non-FD capable, they are at least capable of half duplex.

Co-pending U.S. patent application Ser. No. 17/011,645 filed on Sep. 3, 2020, assigned to the same entity as the present application, discloses several solutions pertaining to UE transmit and receive beam pairing, aiming for reduced self-interference while maintaining accessibility with the base station. The solutions provide a UE with, possibly previously measured or reported, or both, candidate beam set(s) for the UE to select and pair transmit and receive beams and the selected pairs are reported to the base station along with measured self-interference or self-isolation level.

Figure 1B:
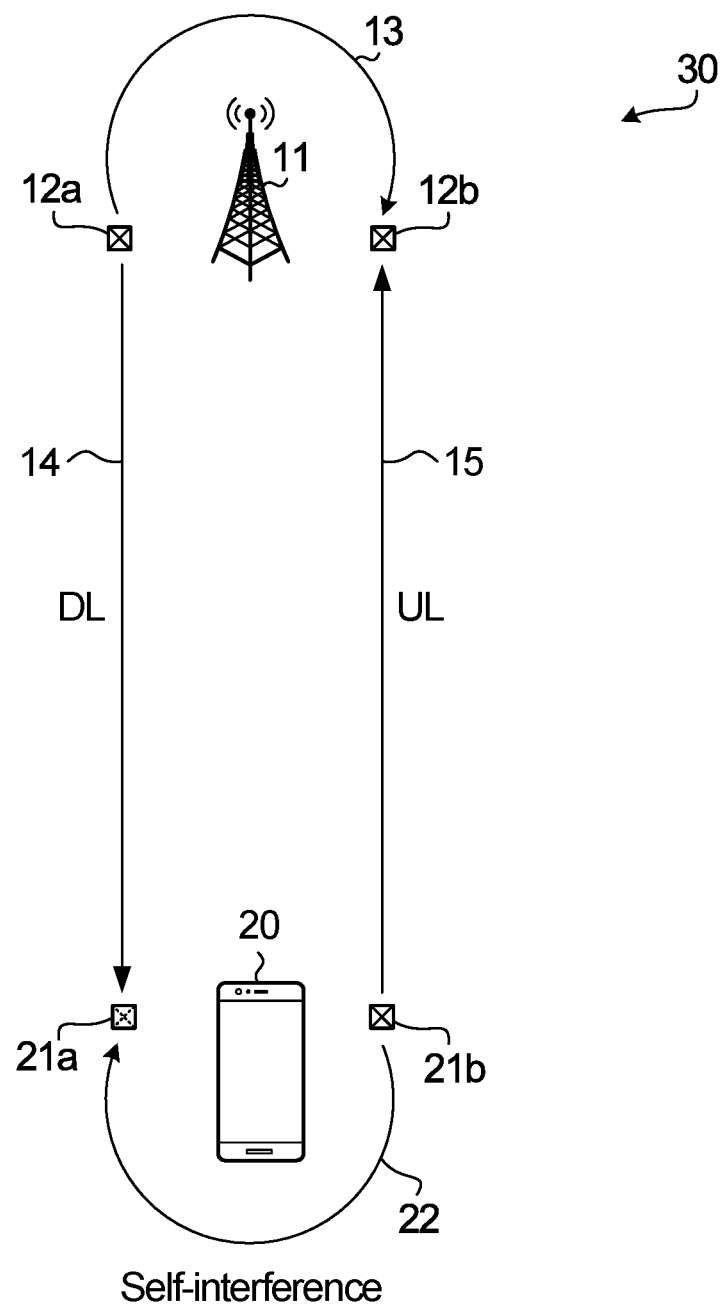
FIG. 1B includes a schematic diagram of a full duplex scheme and also identifying self-interference at a user equipment (UE) between transmit and receive beams.

Assuming analog beamforming at both the base station and the UE have been previously determined, where the self-isolation in analog domain has been exploited, or there is no analog beamforming at all, it appears natural to suppress self-interference, or seek further self-isolation, in the digital domain and obtain DL and UL channel state information (CSI) under self-interference. As shown in FIG. 1B, for FD operation, the DL and UL signals are transmitted and received over separate antennas, and potentially separate beam pairs. Furthermore, the DL and UL signals are intended to be isolated. FIG. 1B shows FD communication 30 between one base station 11 and one UE 20. The base station 11 is shown having two antenna panels 12a, 12b and the UE 20 is shown having two antenna panels 21a, 21b. A DL signal 14 is shown in the direction from the base station 11 to the UE 20 and an UL signal 15 is shown in the direction from the UE 20 to the base station 11. Self-interference 13 is shown between a base station transmit beam from antenna panel 12a and a base station receive beam at antenna panel 12b. Self-interference 22 is shown between a UE transmit beam from antenna panel 21b and a UE receive beam at antenna panel 21a. It is generally not possible to obtain DL CSI from an uplink sounding signal transmitted from the UE to the base station over the UL link during FD operation. While it is possible to have additional uplink sounding signals over antennas, and possibly particular beam pairs, for DL transmission and to obtain DL CSI based on channel reciprocity, such a process may not be able to account for self-interference from the UL of FD operation. Channel reciprocity involves using the characteristics determined for one direction, either UL or DL, in the opposite direction. Being able to obtain DL CSI and UL CSI for FD operation that considers the effect of self-interference would be beneficial.

Figure 1C:
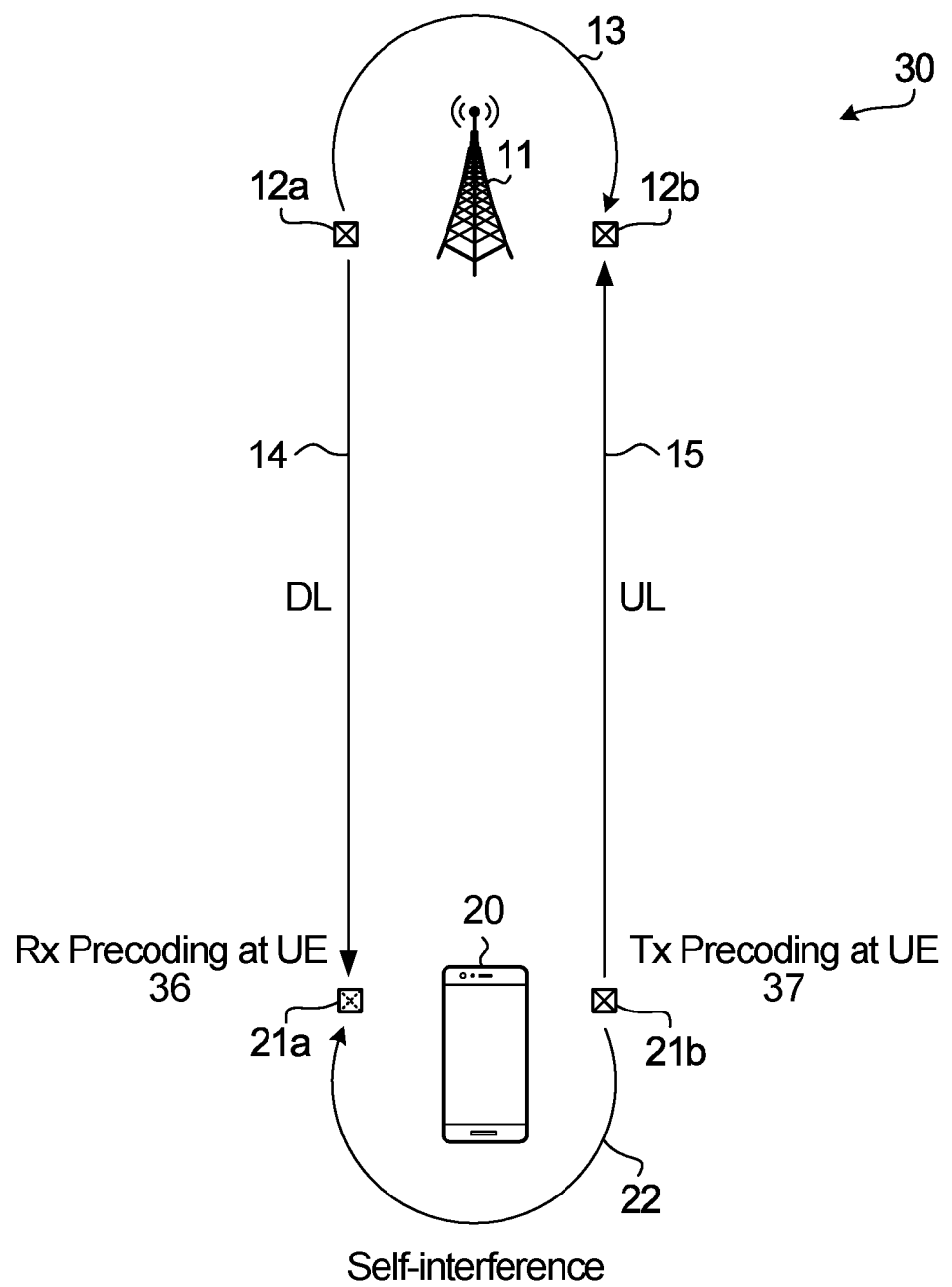

There are several straightforward schemes that can be considered. One scheme is for the base station to determine FD CSI, by combining regular DL CSI, obtained from DL feedback or UL sounding without considering self-interference, and the expected UE UL transmit power and previously obtained wideband self-interference/isolation level at the UE. The base station can first derive the received self-interference at the UE based on the expected UE UL transmit power and a UE self-interference or isolation level (represented by e.g. a signal to interference ratio) reported to the base station. The base station can then update the obtained regular DL CSI feedback (e.g., reducing the channel quality indicator (CQI) by several levels) to accommodate such self-interference when scheduling FD transmission. Under such a scheme, as regular receive digital precoding at the UE side is often left to UE implementation (see FIG. 1C) and usually aims for higher DL rank indicator/channel quality indicator (RI/CQI), the cross-link isolation required by FD operation can be jeopardized. FIG. 1C shows FD communication 30 between one base station 11 and one UE 20 similar to that of FIG. 1B. However, in FIG. 1C, the UE 20 uses receiver (Rx) pre-coding 36 when receiving the DL signal 14 and uses transmitter (Tx) pre-coding 37 when transmitting the UL signal 15. The base station 11 is shown having two antenna panels 12a, 12b and the UE 20 is shown having two antenna panels 21a, 21b. A DL signal 14 is shown in the direction from the base station 11 to the UE 20 and an UL signal 15 is shown in the direction from the UE 20 to the base station 11. Self-interference 13 is shown between a base station transmit beam from antenna panel 12a and a base station receive beam at antenna panel 12b. Self-interference 22 is shown between a UE transmit beam from antenna panel 21b and a UE receive beam at antenna panel 21a. In addition, such a scheme may be unable to improve overall DL-UL isolation via a smarter choice of base station/UE digital precoding. Note that typically the same analog beamforming is applied to an entire transmission bandwidth, but digital precoding can be performed at finer granularity (e.g., at a sub-band level) which enables a smarter choice of base station/UE digital precoding and may help further improve cross-link isolation at finer granularity as well. Another scheme is for the base station to determine UL CSI for FD, based on previous sounding reference signal (SRS) transmission from the UE, the expected DL transmit power and estimated self-interfering channel at the BS. A transmit digital precoding scheme at the UE side is often selected and indicated by the base station, but even after receiving SRS transmission, the base station still does not have enough information to select a UL transmit rank indicator (TRI) and transmit precoding matrix indicator (TPMI) that will not degrade cross-link isolation required by FD operation. Furthermore, such a scheme is unable to account for, or match with, receive digital precoding at the UE side.

The schemes indicated in the paragraph above have certain drawbacks, such as being unable to optimize UE side receive digital precoding for additional cross-link isolation and being unable to facilitate the base station determining UE side transmit digital precoding scheme that does not negatively impact cross-link isolation.

Aspects of the present disclosure provide mechanisms for the base station to acquire CSI for FD DL and UL transmission in a combined manner. In some embodiments, UL CSI is embedded into DL CSI report information and a connection can be established between the UL CSI and the DL CSI. In this case, the DL CSI that is based upon a certain level of UL CSI and UE self-interference can be referred to as FD CSI. More specifically, FD CSI can be acquired while considering self-interference from simultaneous UL transmission in FD mode under different UL precoding schemes (i.e. various values of transmission rank, precoding matrices, etc.). In this way, the base station may be informed about the FD CSI for a particular UL precoding scheme that considers the UL CSI, and hence can be used when scheduling simultaneous FD DL and UL transmission considering channel conditions in both DL and UL, as well as the performance tradeoff between DL and UL. Therefore, the selection of UE side receive digital precoding and transmit digital precoding is able to account for, and may improve, the cross-link isolation and also enable balancing between DL and UL performance in FD.

Figure 2:
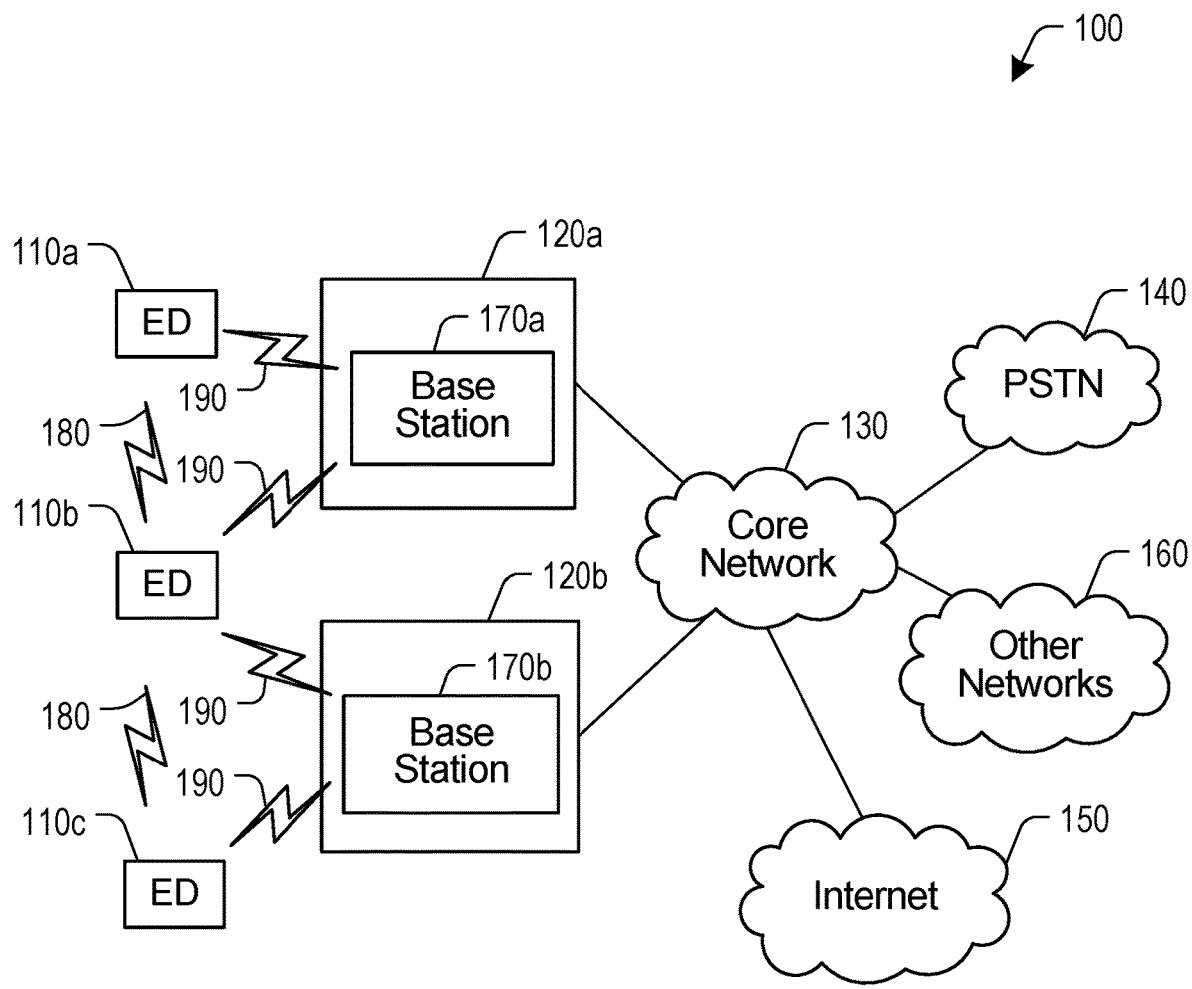
FIG. 2 is a schematic diagram of a communication system in which embodiments of the disclosure may occur.
Figure 3A:
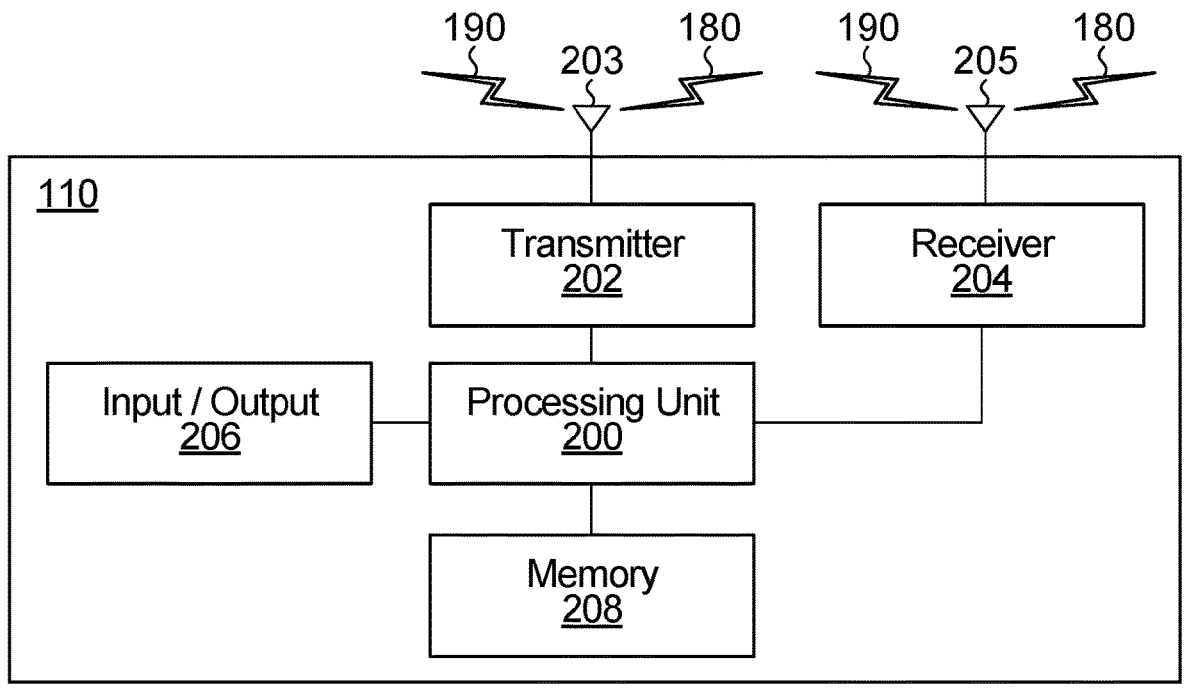
FIGS. 3A, 3B and 3C are block diagrams of an example user equipment and base station, respectively.
Figure 3B:
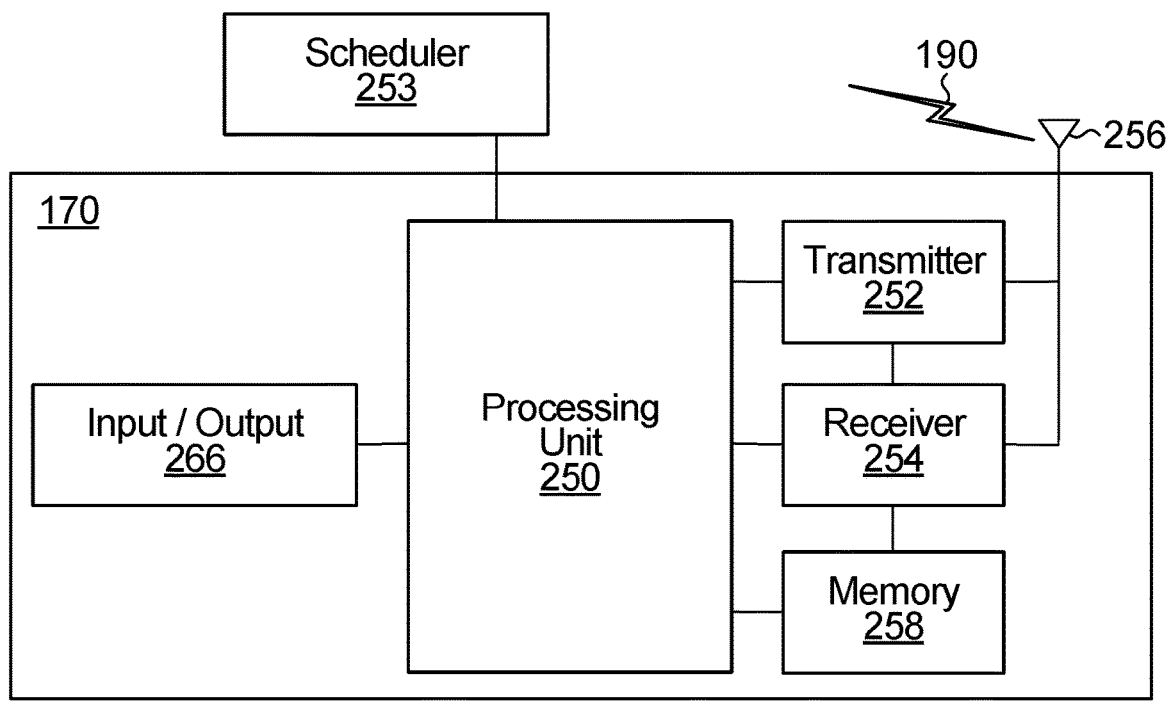

FIGS. 2, 3A, and 3B following below provide context for the network and device that may be in the network and that may implement aspects of the present disclosure.

FIG. 2 illustrates an example communication system 100 in which embodiments of the present disclosure could be implemented. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources such as bandwidth.

In this example, the communication system 100 includes electronic devices (ED) 110a-110c, radio access networks (RANs) 120a-120b, a core network 130, a public switched telephone network (PSTN) 140, the Internet 150, and other networks 160. While certain numbers of these components or elements are shown in FIG. 2, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, consumer electronics device, Internet of Things (IoT) device, wearable device, or vehicular device (or vehicle-mounted device, vehicle on-board equipment).

FIG. 2 illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, multicast, unicast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 2, any reasonable number of these components or elements may be included in the communication system 100.

The EDs 110a-110c are configured to operate, communicate, or both, in the communication system 100. For example, the EDs 110a-110c are configured to transmit, receive, or both, via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 2, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding.

The EDs 110a-110c and base stations 170a-170b are examples of communication equipment that can be configured to implement some or all of the functionality and/or embodiments described herein. In the embodiment shown in FIG. 2, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments, there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as High Speed Packet Access (HSPA), Evolved HPSA (HSPA+) optionally including High Speed Downlink Packet Access (HSDPA), High Speed Uplink Packet Access (HSUPA) or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160).

The EDs 110a-110c communicate with one another over one or more SL air interfaces 180 using wireless communication links e.g. radio frequency (RF), microwave, infrared (IR), etc. The SL air interfaces 180 may utilize any suitable radio access technology, and may be substantially similar to the air interfaces 190 over which the EDs 110a-110c communication with one or more of the base stations 170a-170c, or they may be substantially different. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the SL air interfaces 180. In some embodiments, the SL air interfaces 180 may be, at least in part, implemented over unlicensed spectrum.

In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP) and user datagram protocol (UDP). EDs 110a-110c may be multimode devices capable of operation according to multiple radio access technologies, and incorporate multiple transceivers necessary to support multiple radio access technologies.

Figure 3C:
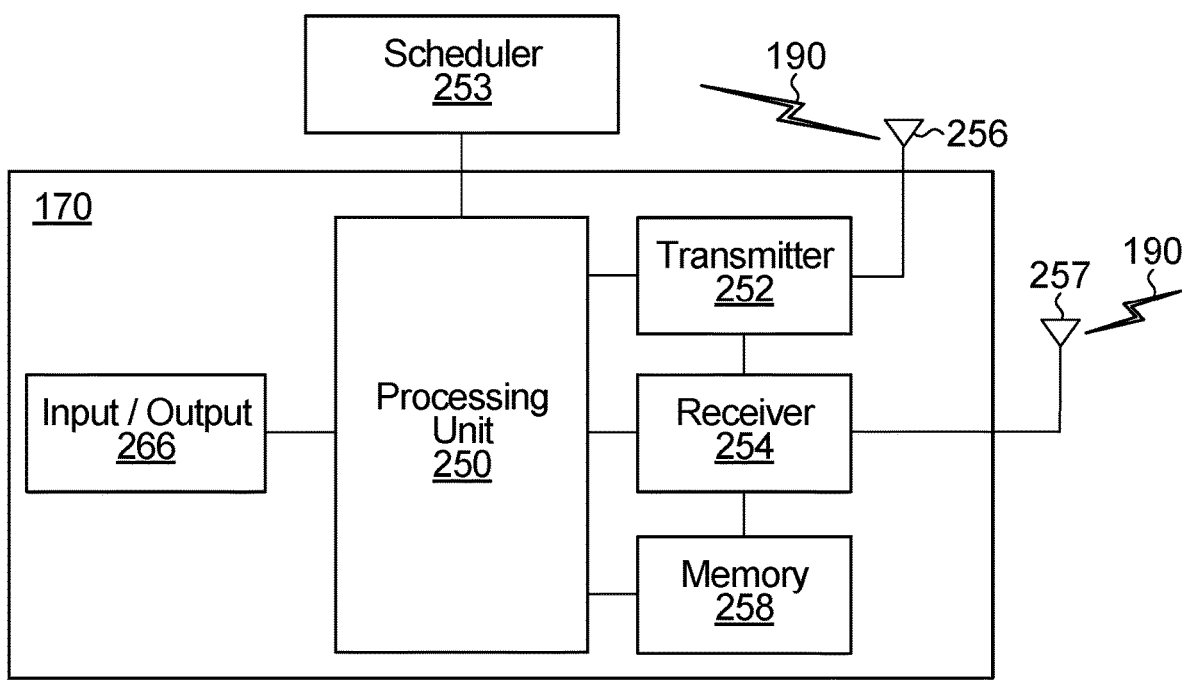

FIGS. 3A, 3B and 3C illustrate example devices that may implement the methods and teachings according to this disclosure. In particular, FIG. 3A illustrates an example ED 110, and FIGS. 3B and 3C each illustrate example base stations 170. These components could be used in the system 100 or in any other suitable system.

As shown in FIG. 3A, the ED 110 includes at least one processing unit or processor 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes a transmitter 202. The transmitter 202 is configured to modulate data or other content for transmission by at least one antenna or Network Interface Controller (NIC) 204. The ED 110 also includes a receiver 204. The receiver 204 is configured to demodulate data or other content received by at least one antenna 205. The transmitter 202 and receiver 204 includes any suitable structure for generating signals for wireless or wired transmission and/or processing signals received wirelessly or by wire. Each antenna 204 and 205 each includes any suitable structure for transmitting (antenna 204) and/or receiving (antenna 205) wireless or wired signals. One or multiple transmitters 202 and receivers 204 could be used in the ED 110. One or multiple transmit antennas 204 or receive antennas 205 could be used in the ED 110. One or more of the antennas 204, 205 may each have one or more antenna panels. Although shown as a separate transmitter and receiver functional units, these devices could also be implemented using at least one transceiver. While FIG. 3A illustrates the base station including two antennas, in other embodiments, both the transmitter and receiver, or a transceiver, may be connected to a single antenna, having one or more antenna panels.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3B, the base station 170 includes at least one processing unit or processor 250, at least one transmitter 252, at least one receiver 254, one or more antennas 256, at least one memory 258, and one or more input/output devices or interfaces 266. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

FIG. 3C in another version of the base station 170 that shows many of the same elements as FIG. 3B. In particular, the base station 170 includes at least one processing unit 250, at least one transmitter 252, at least one receiver 254, at least one memory 258, and one or more input/output devices or interfaces 266. A scheduler 253 may be coupled to the processing unit 250. The main difference between FIGS. 3B and 3C is that there are two antennas 256,257, one coupled to each of the transmitter 252 and the receiver 254, respectively. The same numbered elements in the two figures have similar functionality.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each of the antennas 256,257 includes any suitable structure for transmitting (antenna 256) and/or receiving (antenna 257) wireless or wired signals. Although a single transmit antenna 256 is shown coupled to the transmitter 252 and a single receive antenna 257 is shown coupled to the receiver 254, more than one antenna could be coupled to either the transmitter 252 or the receiver 254. Furthermore, each antenna 256, 257 may include one or more antenna panels.

Additional details regarding the UEs 110 and the base stations 170 are known to those of skill in the art. As such, these details are omitted here for clarity.

In existing 3GPP specifications, a beamforming behavior at the base station side is often unspecified, while the beamforming behavior at the UE side is often captured with more details. The concept of a beam pair consisting of one beam at the base station and one beam at the UE was used above and in FIG. 1A for illustration purposes. Aspects of the following description will describe the beamforming behavior at the UE side and beam pairing mainly refers to pairing the transmit beam and receive beam at the UE side.

Some embodiments of the disclosure pertain to FD CSI acquisition with UE self-interference emulation. Such embodiments allow the UE to emulate the impact of simultaneous UL transmission with different UL precoding schemes, including transmit rank indicator (TRI) or transmit precoding matrix indicator (TPMI), or both, which are hypothetically applied onto a self-interfering channel when deriving the FD CSI feedback. In some embodiments, the characteristics of the self-interfering channel are assumed to be known at UE. The characteristics of the self-interfering channel may be obtained by transmitting and receiving certain reference signals and estimating the self-interfering channel occurring at the UE by the UE itself.

In embodiments related to FD CSI acquisition with UE self-interference emulation, this disclosure describes:
1) A base station provides an association between a reference signal resource, an example of which may be a channel state information reference signal (CSI-RS), for channel measurement, and a reference signal resource, an example of which may be a sounding reference signal (SRS), for self-interfering channel estimation, and a reporting configuration format to be applied;
2) UE measurement behavior that includes hypothetically applying different UL transmit precoding schemes (including TRI or TPMI, or both) on an estimated self-interfering channel and deriving the corresponding FD CSI feedback (including RI/CQI/PMI); and
3) UE reporting that includes reporting to the base station the derived FD CSI feedback and the corresponding UL transmit precoding scheme that was assumed.

In the subsequent discussion, while reference signal resources for channel measurement are generally referred to as CSI-RS and reference signal resources for self-interfering channel estimation are generally referred to as SRS, it is to be understood that these resources could be other types of reference signals that could be used for channel measurement and self-interfering channel estimation.

Figure 4A:
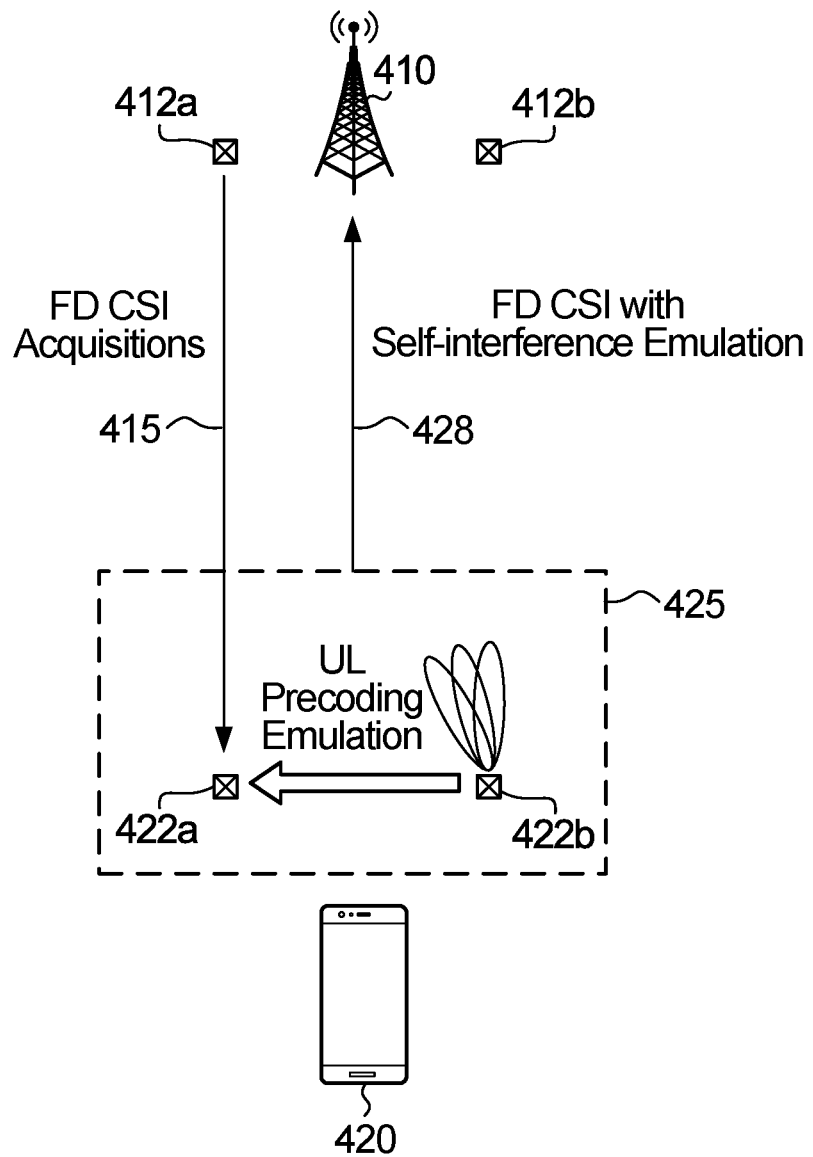
FIG. 4A is a schematic diagram of a full duplex scheme configured to determine a DL channel state information report that takes into consideration self-interference at the UE according to an aspect of the disclosure.

FIG. 4A is a schematic diagram of a high level view of how FD CSI acquisition with UE self-interference emulation may be implemented according to embodiments of the present disclosure. FIG. 4A shows communication between one base station 410 and one UE 420. The base station 410 is shown having two antenna panels 412a, 412b and the UE 420 is shown having two antenna panels 422a, 422b. A DL signal 415 is shown in the direction from the base station 410 to the UE 420. The UE 420 determines FD CSI to be sent to the base station 410 by emulating 425 self-interference from antenna 422b to antenna 422a with different UL transmit precoding schemes. Further detail will be provided below about how the emulation of self-interference can be performed. FD CSI 428, which includes information of the self-interference emulation, is reported to the base station 410 by the UE 420.

Some embodiments of the disclosure pertain to node selection or beam selection, or both, with UE self-interference emulation. Such embodiments may be used for multiple transmit receive point (TRP) and integrated access backhaul (IAB) scenarios with multiple nodes on the network side, where the UE is receiving from one node, but transmitting towards another node, with which a higher possibility of FD operation is possible.

In embodiments related to node selection or beam selection, or both, with UE self-interference emulation, this disclosure describes:
1) A base station provides an association between one or multiple reference signal resources, an example of which may be one or multiple CSI-RS resource set(s), for channel measurement and one or multiple reference signal resources, an example of which may be one or multiple SRS resource set(s), for self-interfering channel estimation and a reporting configuration format to be applied;
2) UE measurement behavior that includes hypothetically applying different UL transmit precoding schemes on estimated self-interfering channel and deriving the corresponding FD CSI feedback, which may include using different combinations of reference signal resources for channel measurement and reference signal resources for self-interfering channel estimation; and
3) UE reporting that includes reporting to the base station the derived FD CSI feedback and the corresponding UL transmit precoding scheme that was assumed, and also information on selected reference signal resources for channel measurement and/or reference signal resources for self-interfering channel estimation.

Figure 4B:
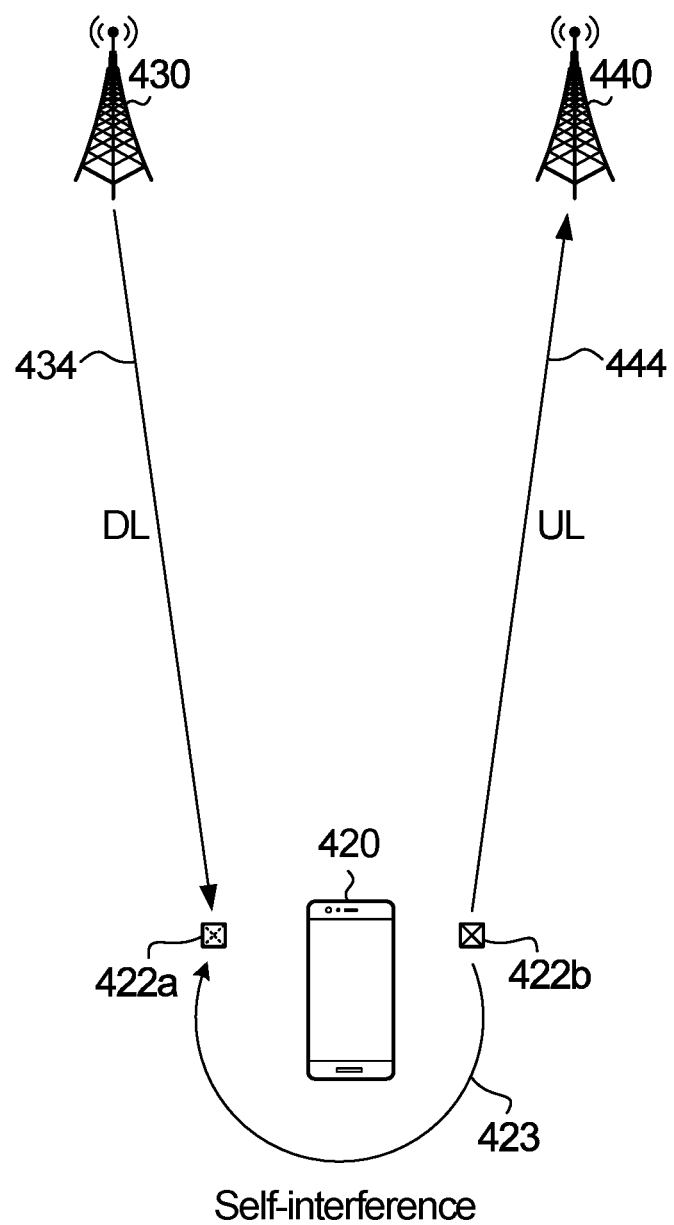
FIG. 4B is a schematic diagram of a full duplex scheme configured to determine a DL channel state information report and select one of multiple nodes that takes into consideration self-interference at the UE according to an aspect of the disclosure.

FIG. 4B is a schematic diagram of network elements, including two base stations and a single UE, on which embodiments of the present disclosure may occur, such as node selection with UE self-interference emulation. FIG. 4B shows communication between a first base station 430 and one UE 420 and a second base station 440. The UE 420 is shown having two antenna panels 422a, 422b. The UE 420 receives a DL signal 434 from the first base station 430 at antenna panel 422a and transmits an UL signal 444 to the second base station 440 from antenna panel 422b. There is self-interference 423 between the two antenna panels 422a, 422b that can be emulated under different UL transmit precoding schemes to aid the communication between the various network elements. Further detail will be provided below about how the node selection or beam selection, or both, with emulation of self-interference can be performed.

The following paragraphs provide a more detailed explanation of FD CSI acquisition with UE self-interference emulation.

Figure 5A:
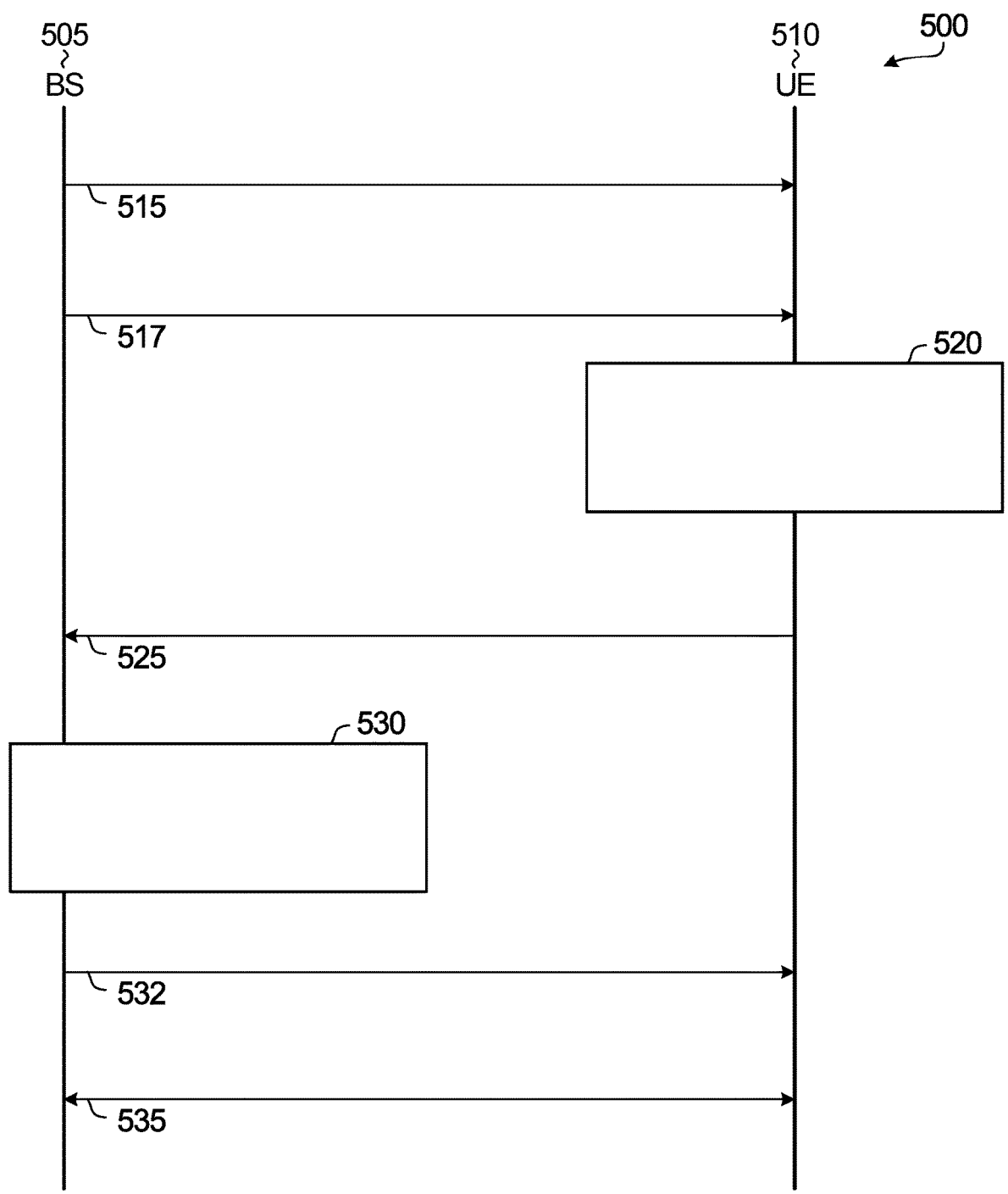
FIG. 5A is a signal flow diagram illustrating signaling between a base station and a UE for determination of a DL channel state information report that takes into consideration self-interference at the UE according to an aspect of the disclosure.

FIG. 5A is a signal flow diagram 500 illustrating communications that occur between a base station 505 and a UE 510. At 515, the BS 505 transmits configuration information including identification of a reference signal, for example a CSI-RS resource, to be used for FD CSI acquisition. This reference signal resource for FD CSI acquisition is associated with a corresponding reference signal for self-interfering channel estimation. In some embodiments, this may be sounding reference signal (SRS) resource. The reference signal resource for self-interfering channel estimation may be used by the UE 510 to perform transmit and receive beam pairing considering self-interference, self-isolation, or estimating a self-interfering channel when the UE 510 is transmitting and receiving simultaneously. If this reference signal resource for FD CSI acquisition is not provided with a quasi-colocation (QCL) or beam indication, and the associated reference signal resource for self-interfering channel estimation is assigned for the UE to pair transmit and receive beams or the associated reference signal resource for self-interfering channel estimation is provided with receive beam information, the UE 510 may receive the reference signal resource for FD CSI acquisition with the receive beam selected or configured for the associated reference signal resource for self-interfering channel estimation. An example of how the associated SRS resource for self-interfering channel estimation may be assigned for the UE to pair transmit and receive beams is described in co-pending U.S. patent application Ser. No. 17/011,645 filed on Sep. 3, 2020 assigned to the same entity as the present application. Therein, it is described that for FD transmission, to enable UE transmit and receive beam pairing for UL and DL, in which the beam pair is a UE transmit beam and a UE receive beam, and for estimation of self-interference or self-isolation at the UE, the base station may configure multiple SRS resources for the UE. In some implementations the SRS resources are not configured with QCL or receive beam information, but it is up to the UE to select a receive beam and pair that receive beam with a UE transmit beam. In some implementations, the SRS resources may be provided with QCL or receive beam information, and the UE is expected to select a transmit beam to pair with the receive beam indicated in the QCL or receive beam information. In both cases, the receive beam that is used for the SRS resource for self-interference or self-isolation estimation can also be applied as the reference signal resource for FD CSI acquisition as described above.

In some embodiments, configuration information may include additional information that indicates interference measurement information and FD CSI reporting information, examples of which will be described below with regard to FIG. 6.

At 517, the base station 520 sends the reference signal resource for FD CSI acquisition as identified in 515.

Figure 5B:
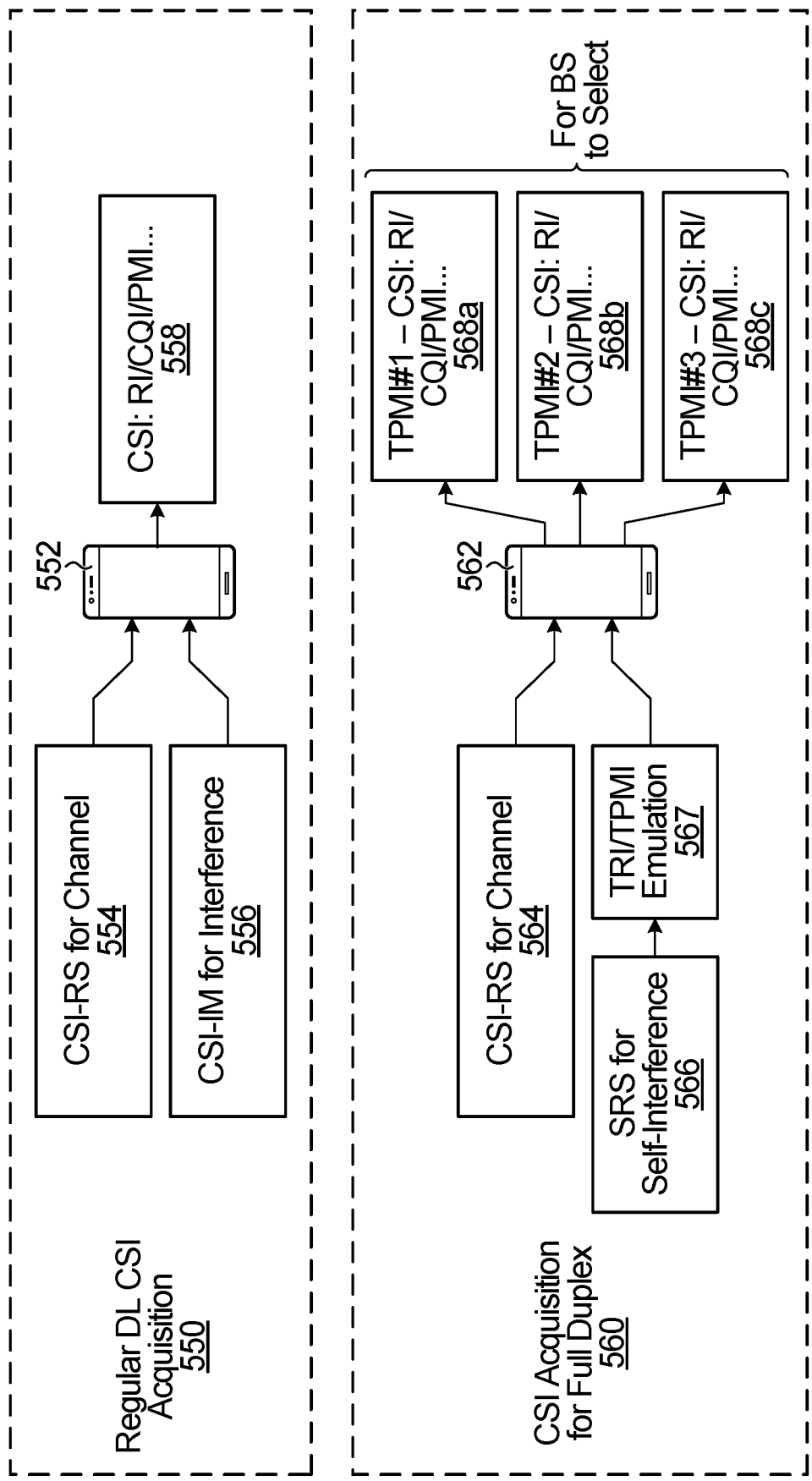
FIG. 5B is a schematic diagram illustrating a difference between conventional DL CSI acquisition and FD CSI acquisition that takes into consideration self-interference at the UE according to an aspect of the disclosure.

At 520, assuming the associated reference signal resource as the source of interference, the UE 510 determines one or multiple FD CSI report(s) when affected by UL transmission interference from the UE itself based on a corresponding reference signal for self-interfering channel estimation assigned by the UE. Each FD CSI corresponds to a respective UL TRI value or UL TPMI value, or both, that are applied hypothetically. Such idea and difference with existing mechanisms are depicted in FIG. 5B. In some embodiments, the UL TRI or the UL TPMI, or both, to be applied in a hypothetical manner is pre-arranged. In some embodiments, the UL TRI or the UL TPMI, or both, to be applied in a hypothetical manner is indicated by the base station 505 as part of measurement instructions provided in 515. The UL TRI or the UL TPMI, or both, may be applied in addition to analog transmit beam for the reference signal resource for self-interfering channel estimation, either configured by the base station 505 or selected by the UE 510 in the manner described immediately above.

At 525, the UE 510 reports one or more FD CSI to the base station 505. Digital receive precoding at the UE 510 and calculation of one or more of DL rank indicator (RI), channel quality indicator (CQI), and precoding matrix indicator (PMI) may account for self-interference occurring at the UE 510 from particular UL TRI or UL TPMI, or both. Because the determined values of DL RI/CQI/PMI can be different for different values of UL TRI and ULTPMI, the FD CSI report from the UE 510 may consist of DL RI/CQI/PMI and information pertaining to the corresponding UL TRI or UL TPMI, or both, so that the base station 505 is made aware of what TRI/TPMI were assumed when determining the DL RI/CQI/PMI feedback.

Additionally, the base station 505 may configure the UE 510 to apply differential encoding for one or more of RI/CQI/PMI parameter values for corresponding UL TRI and UL TPMI, so to reduce feedback overhead. Such configurations can be conveyed by reporting instructions in 515. For example, for a first set of UL TRI and UL TPMI, the UE reports RI/CRI/PMI values directly, while for a second set of UL TRI and UL TPMI, the UE reports the difference between RI/CRI/PMI for the second set of UL TRI/TPMI and RI/CRI/PMI for the first set of UL TRI/TPMI, respectively. Note that the association between the reference signal for channel measurement and reference signal for self-interfering channel estimation can be introduced in addition to association between the reference signal for channel measurement and CSI-IM for interference measurement/estimation. Here CSI-IM denotes the resource(s) (i.e. channel state information) used for interference measurement (IM).

FIG. 5B is a schematic drawing of a comparison between a conventional DL CSI acquisition 550, for example that may be used for half duplex, and CSI acquisition 560 for full duplex according to embodiments of the present disclosure. For conventional DL CSI acquisition 550, the UE 552 is informed of CSI-RS 554 and optionally associated CSI-IM 556, which allows the UE 552 to determine a CSI report 558. The CSI report 558 may include RI/CQI/PMI information that can be sent to a base station. For FD CSI acquisition 560 according to embodiments of the present disclosure, the UE 562 is informed of CSI-RS 564 and associated SRS 566, which allows the UE 562 to apply particular values of TRI/TPMI emulation 567 to determine a CSI report 568. In the particular example of FIG. 5B, multiple TRI/TPMI emulation values are used which result in three CSI reporting values 568a, 568b and 568c, which may include RI/CQI/PMI information, for respective values of TPMI.

At 530, the base station 505 after receiving FD CSI feedback sent in 525 with self-interference emulation from the UE 510, the base station 505 generates scheduling information for FD transmissions utilizing the reported DL RI/CQI/PMI and corresponding UL TRI/TPMI. The scheduling may include the base station selects a preferred transmission method based on the one or more CSI reports received by the base station 505. For example, if there are multiple FD CSI based on multiple emulated UL TRI/TPMI values received from the UE 510, once the base station 505 makes the selection, the base station 505 may notify the UE 510 the TRI/TPMI corresponding to the selected CSI report, as part of scheduling information for FD transmission. For FD transmission, the reported DL RI/CQI/TPMI is obtained with assumed UL TRI or UL TPMI, or both. To avoid overwhelming a self-interference cancellation capability at the UE 510, the base station 505 may be not schedule a DL MCS that is higher than an MCS value corresponding to the reported CQI value. Alternatively, it can be pre-determined that the UE 510 is not expected to deal with the case where scheduled DL MCS is higher than the MCS value corresponding to the reported CQI value.

At 532, the base station 505 transmits the scheduling information to the UE 505.

At 535, the base station 505 transmits data to the UE 510 based on the scheduling decision made a step 530 and the UE 510 may be transmitting data to the base station 505 as part of the FD capability of the base station 505 and UE 510.

FIGS. 6, 7, 8, 9, and 10 provide examples and illustrations of how embodiments disclosed herein may be implemented. In some cases the subject matter may be implemented by building on existing processes. Being able to build on existing processes can be useful as it allows new concepts to be implemented with existing mechanisms.

Figure 6:
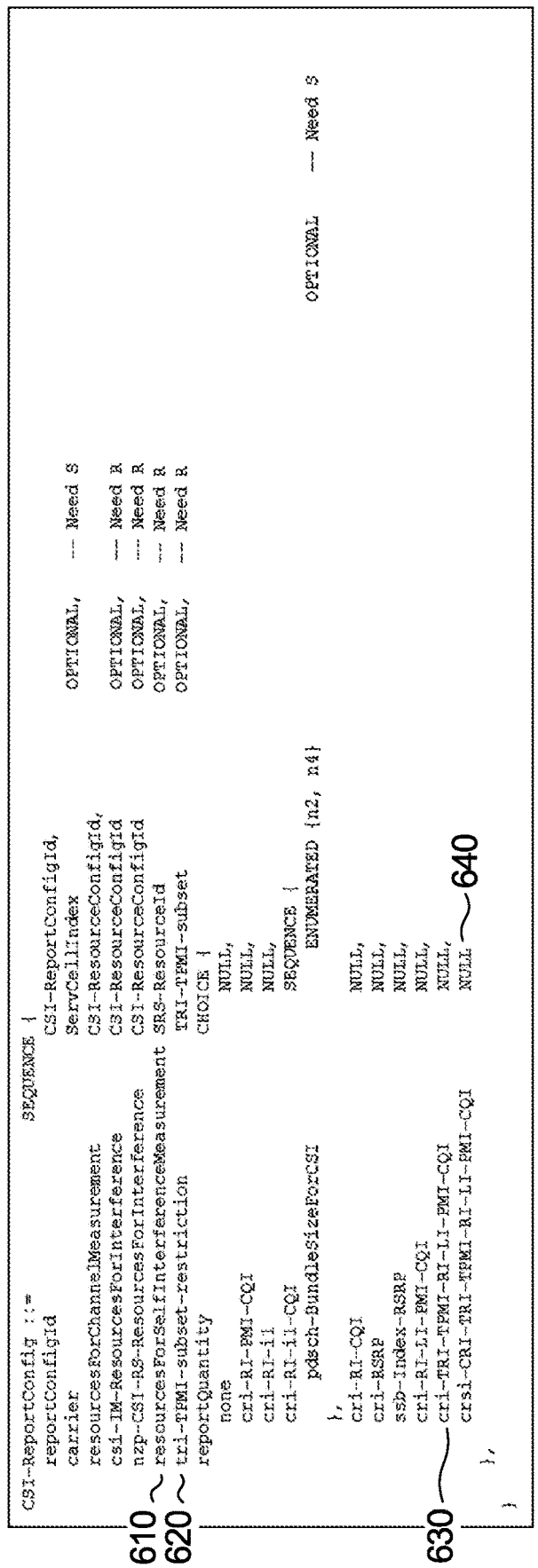
FIG. 6 is a representation of CSI reporting configuration information transmitted by a base station to a UE according to an aspect of the disclosure.

FIG. 6 is an example of a configuration information element (IE) 600 including multiple fields that can be sent by a base station to a UE to provide the UE information about how the UE should report CSI information pertaining to FD communication back to the base station. CSI information may need to be reported back to the base station for a variety of reasons, but in this case, the FD CSI is being determined by emulating self-interference. A majority of the fields in FIG. 6 are from an existing example of a CSI reporting configuration IE 600 (CSI-ReportConfig). The IE includes a collection of parameters such as a report configuration, identification of resource(s) for channel measurement, CSI-IM resource(s) for interference measurement as well as a variety of report parameters that could be used to instruct UE measurement behavior or reporting behavior, or both. New parameters that could be included in the configuration IE include an identification 610 of a resource to be used for self-interference measurement (resourceForSelfInterferenceMeasurement) and an identification 620 of restriction on transmit rank indicator (TRI) and transmit precoding matrix indicator (TPMI) values (tri-TPMI-subset-restriction). Examples of report parameters to be reported by the UE that could be included in the configuration IE may include CSI-RS resource indicator (CRI), CSI-RS resource set indicator (CRSI), TRI, TPMI, RI, layer indicator (LI), PMI and CQI in the form of cri-TRI-TPMI-RI-LI-PMI-CQI 630 and crsi-CRI-TRI-TPMI-RI-LI-PMI-CQI 640. These two elements 630 and 640 are each a list of parameters that the base station is instructing the UE to report back to the base station.

The added content 610, 620, 630, 640 in the configuration IE 600 in FIG. 6 is for the base station to indicate to the UE an association between CSI-RS(s) for FD CSI acquisition (i.e., resourcesForChannelMeasurement) and SRS for self-interfering channel estimation (i.e., resourcesForSelfInterferenceMeasurement), and TRI/TPMI(s) that are to be emulated (i.e., tri-TPMI-subset-restriction), and the reporting content/format (i.e., cri-TRI-TPMI-RI-LI-PMI-CQI, crsi-CRI-TRI-TPMI-RI-LI-PMI-CQI).

As a reference, FIGS. 7 and 8 show examples of mechanisms for a base station to indicate to the UE TPMI configuration information for UL transmission as proposed in 3GPP, Technical Specification 38.211, "Physical channels and modulation", ver. g10, March 2020.

The TPMI configuration information includes a TPMI index that provides reference to a precoding matrix W to be applied. The interpretation of TPMI index may depend, at least in part, on a number of UL antenna ports and layers to be applied. The number of UL antenna ports and layers may alternatively be expressed in the form of UL TRI. In FIG. 7, there are six indices labelled 0-5 arranged from left to right in increasing order of the TPMI index. In FIG. 8, there are three indices labelled 0-2 arranged from left to right in increasing order of the TPMI index.

FIG. 9 is an example of a configuration IE that can be used by the base station to indicate to the UE the TRI(s) and TPMI(s) that should be applied for self-interference emulation as proposed by embodiments of the present disclosure in a new dedicated signaling. For example, the TRI can be identified by an index value (n1 and n2, where n1 indicates TRI=1, and n2 indicates TRI=2) and the bits in the bitstring used for TPMI can be a '1' or a '0' to represent whether a TPMI(s) is emulated or not. While only two options n1 and n2 are indicated in the example of FIG. 9 for TRI, it should be understood that there could be more than two values. When reporting the selected TPMI to the base station, relative indexing among those configured by the base station, i.e. when the corresponding bit is set to '1', can be applied to reduce signaling overhead.

The additional reporting of an assumed UL TRI or TPMI, or both, can also be incorporated into existing methods for having the UE reporting related information, if appropriate. Alternatively, the reporting can be arranged outside existing manners, if desired. The assumed TRI and/or TPMI can be reported in a form of relative index among those indicated by the base station. In some embodiments, when considering the arrangement of the order of the parameters, the TRI and TPMI may be included before the RI, LI, and PMI, as indicated in FIG. 6, for example. One reason for this may be due to the UE being expected to derive the RI, LI, and PMI by assuming the reported TRI and TPMI as there is a dependency and correspondence between the RI, LI, and PMI and TRI and TPMI. A determination of whether or not to include each field in a report may be made by the base station and indicated in the configuration information sent by the base station. As mentioned above, the reporting of the assumed TRI value may be alternatively expressed in the form of assumed antenna ports and number of layers for UL transmission.

In some embodiments, the UE will transmit and receive the SRS for self-interfering channel estimation and keep information on the estimated self-interfering channel. In some embodiments, similar to existing implementation in 5G NR, the base station will inform the UE about the number of antenna ports for the CSI-RS resource for channel measurement and the number of antenna ports for the SRS resource for self-interfering channel estimation. In some embodiments, the UE reports to the network or base station whether the UE supports such joint DL and UL CSI acquisition for FD operation to the BS in advance, possibly in the form of UE capability reporting.

In some embodiments, aspects of the present disclosure enable a network to account for impacts of digital transmit and receive precoding at the UE side in the presence of UE self-interference that may occur during FD operation, which is not possible with the schemes described above with reference to FIGS. 1B and 10.

The following paragraphs provide a more detailed explanation of a method of node selection or beam selection which includes UE self-interference emulation.

In some embodiments, a CSI-RS resource set is associated with a SRS resource for performing self-interfering channel estimation, where each CSI-RS source represents a respective network side node, such as an access point or base station for the node selection scenario, or one out of multiple beams from one or more network side nodes, for the beam selection scenario. This can be achieved by letting an identifier of the recourse used for channel measurement, for example resourcesForChannelMeasurement 610 in the reporting configuration IE 600 in FIG. 6, refer to multiple CSI-RS resources. In some embodiments, this may mean multiple resources are identified within a single CSI-RS resource set. With such modified association, FD CSI acquisition with UE self-interference emulation as described above described can be performed with each CSI-RS resource, and then selected across multiple CSI-RS resources. In some embodiments, in addition to selected UL TRI/TPMI(s) and corresponding DL RI/CQI/PMI, a CSI-RS resource indicator (CRI) is reported to represent the preferred node or preferred beam for DL reception in FD mode. The base station can use the CRI value to determine the preferred node or preferred beam for communication with the UE in FD mode. As the reference signal could be a reference signal other than a channel state information reference signal, the CSI-RS resource indicator may more generally be considered a reference signal (RS) for FD CSI resource indicator.

Figure 10:
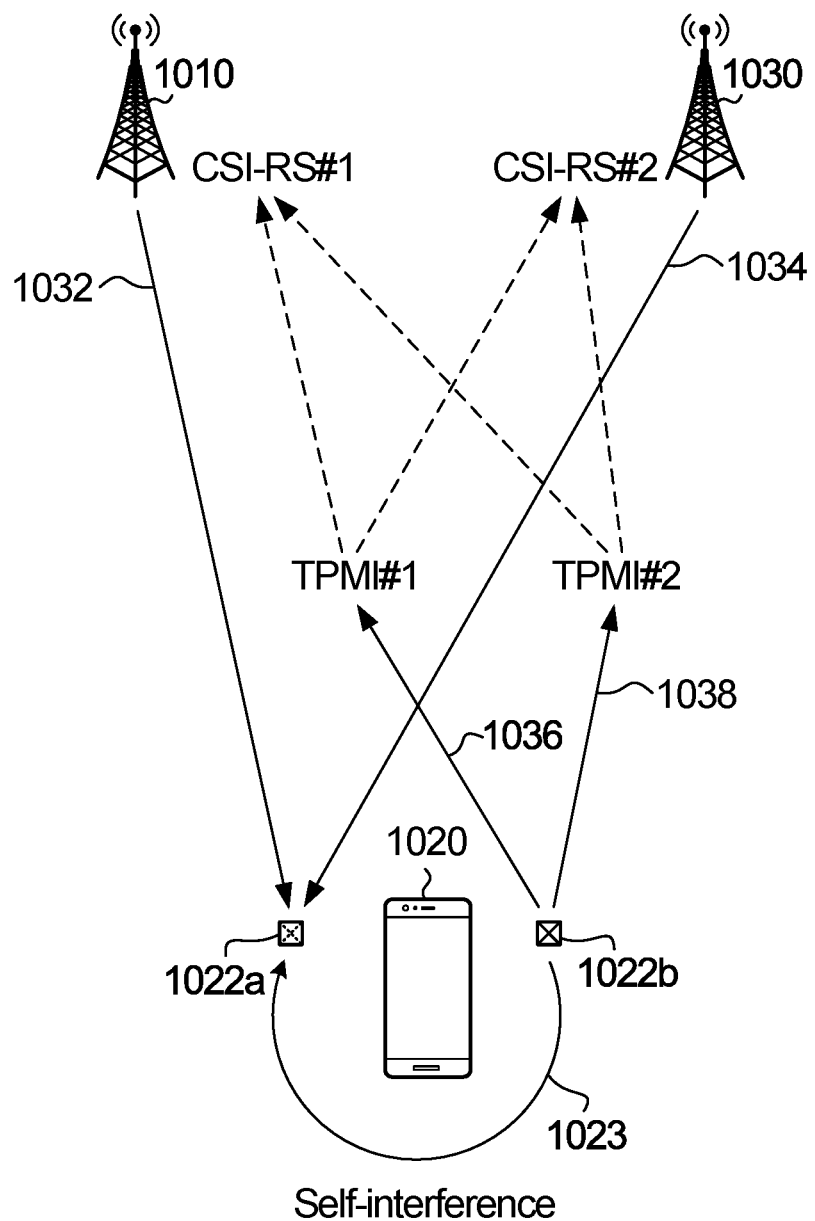
FIG. 10 includes a schematic diagram of a full duplex scheme and also identifying self-interference at a UE that uses transmit and receive pre-coding between transmitter and receiver.

FIG. 10 is a schematic diagram of network elements, including two base stations and a single UE, on which embodiments of the present disclosure may occur. FIG. 10 shows communication between a first base station 1010 and one UE 1020 and a second base station 1030. The UE 1020 is shown having two antenna panels 1022a, 1022b. There is self-interference 1023 between the two antenna panels 1022a, 1022b that can be hypothetically emulated under different UL transmit precoding schemes to aid the communication between the various network elements. As depicted in FIG. 10, both TPMI #1 (first UL transmit precoding scheme 1036) and TPMI #2 (second UL transmit precoding scheme 1038) can be emulated for CSI-RS #1 (representing first base station 1100) and CSI-RS #2 (representing first base station 1100).

In some embodiments, one CSI-RS resource set is used to represent one node, allowing different CSI-RS resources within the same set to represent different beams under one node. In this case, multiple CSI-RS resource sets for channel measurements can be associated with one SRS resource for self-interfering channel estimation. In such a scenario, both CRSI and CRI may be reported to the base station. This is also illustrated in the reporting configuration IE 600 in FIG. 6 in the form of 640.

In some embodiments, one or multiple CSI-RS resource(s) for channel measurements are associated with multiple SRS resources for self-interfering channel estimation (e.g., a SRS resource set), so that different transmit beams or transmit and receive beam pairs at the UE can be applied to different SRS resources, allowing the UE self-interference emulation to be performed across different transmit and receive beam pairs at the UE side. In this case, the selected SRS resource is reported to the base station, in the form of an SRS resource indicator (SRI). In some embodiments, in which multiple CSI-RS resource sets for channel measurement are associated with multiple SRS resource sets for self-interfering channel estimation, the selected SRS source set is reported to the base station, in the form of an SRS resource set indicator (SRSI). If multiple association schemes, such as those proposed above, are available, the UE may report which kind of association the UE can support for joint DL and UL CSI acquisition for FD operation to the base station in advance. In some embodiments, this may be included as part of capability information reported by the UE to the base station.

Some embodiments include joint DL node selection and beam selection and UE self-interference emulation, so that the UE is enabled with FD operation that includes receiving from one node, but transmitting towards another node. When compared with the case where the UE receives from, and transmits, to a same node, because when two separate nodes are involved and the two nodes are more physically separated, the chance of achieving higher cross-link isolation, and hence FD transmission, is higher.

While the description above mainly focused on the case of base station-to-UE(s) FD communication, it should be understood that the core ideas described herein can be naturally extended and applied to the scenarios with base station-to-base station (backhaul), UE-to-UE (sidelink), and access point (AP)-to-AP FD communications.

While reference to CSI-RS has been described above, it should be understood that other types of DL reference signals could be used, such positioning reference signal (PRS) or tracking reference signal (TRS), with which the CRI can be replaced by PRS or TRS resource indicator, respectively.

Furthermore, the SRS described above can be replaced by other UL signals or channels, such as physical uplink control channel (PUCCH) or random access channel (RACH), and the SRI can be replaced by PUCCH or RACH resource indicator, respectively.

While TRI is used for simplicity in the above description, TRI can alternatively be expressed in the form of UL antenna ports and number of UL transmission layers (as shown in FIGS. 6 and 7), with which the corresponding configuration and reporting related TRI can be modified to UL antenna ports and number of UL transmission layers accordingly.

FIG. 11 is a signal flow diagram 1100 illustrating communications that occur between a first base station (BS #1) 1105, a UE 1115 and a second base station (BS #2) 1110. At 1120 and 1125, either BS #1 1105 or BS #2 1110 transmits configuration information including an identification of reference signal for FD CSI, for example a CSI-RS resource(s), to be used for FD CSI acquisition for BS #1 1105 and BS #2 1110. In some embodiments, the network may select which of BS #1 1105 or BS #2 1110 should be transmitting the configuration information. In some embodiments, the negotiation may occur over backhaul between BS #1 1105 and BS #2 1110 as to which base station should be transmitting the configuration information. Each reference signal resource for FD CSI is associated with a corresponding reference signal resource for self-interfering channel estimation for a respective base station, i.e. BS #1 or BS #2. In some embodiments, this may be a sounding reference signal (SRS) resource. Each reference signal resource for self-interfering channel estimation can also be used for the UE 1115 to perform transmit and receive beam pairing considering self-interference, self-isolation, or estimating a self-interfering channel when the UE 1115 is transmitting and receiving simultaneously. In some embodiments, configuration information may include additional information that indicates measurement instructions and reporting instructions, examples of which will be described below with regard to FIG. 6.

At 1130, BS #1 1105 sends a reference signal resource for FD CSI as identified in 1120 or 1125 and at 1135 BS #2 1110 sends a reference signal resource for FD CSI as identified in 1120 or 1125. While 1130 and 1135 are shown occurring close to simultaneously, this is not necessarily the case in all embodiments. The UE 1115 may be configured to receive different reference signal resources for FD CSI at different time instances.

At 1140, for a particular base station (either BS #1 1105 or BS #2 1110) and corresponding reference signal resource for FD CSI, assuming the associated reference signal resource as the source of self-interference, the UE 1115 determines one or multiple FD CSI report(s). Each FD CSI corresponds to a respective UL TRI or UL TPMI value, or both, that is applied hypothetically. In some embodiments, the UL TRI or UL TPMI, or both, to be applied in a hypothetical manner is pre-arranged. In some embodiments, the UL TRI or UL TPMI, or both, to be applied in a hypothetical manner is indicated by BS #1 1105, or BS #2 1110 as part of measurement instructions provided in 1120 or 1125. The hypothetical values for TRI/TPMI may be applied in addition to analog transmit beam for the reference signal resource, either configured by BS #1 1105 or selected by the UE 1115.

At 1150 and 1155, the UE 1115 reports one or more FD CSI to the BS #1 1105 or one or more FD CSI to the BS #2 1110, or the UE 1115 reports to both BS #1 1105 and BS #2 1110, according to measurement and reporting instructions provided in 1120 or 1125. Digital receive precoding at the UE 1115 and calculation of DL rank indicator, channel quality indicator, and precoding matrix indicator (RI/CQI/PMI) may account for self-interference occurring at the UE 1115 from particular UL TRI or UL TPMI. Because the determined values of DL RI/CQI/PMI can be different for different values of UL TRI or UL TPMI(s), or both, the FD CSI report from the UE 1115 may consist of DL RI/CQI/PMI and a corresponding UL TRI/TPMI, so that BS #1 1105 or BS #2 1110, or both, are made aware of what UL TRI or UL TPMI, or both, were assumed when determining the DL RI/CQI/PMI feedback. While 1150 and 1155 are shown occurring close to simultaneously, this is not necessarily the case in all embodiments.

Additionally, the BS #1 1105 may configure the UE 1115 to apply differential encoding on RI/CQI/PMI(s) according to corresponding UL TRI or UL TPMI(s), or both, so to reduce feedback overhead, and such configurations are conveyed by reporting instructions in 1120. For example, for first set of UL TRI and UL TPMI, or both, the UE 1115 reports RI/CRI/PMI(s) directly, while for second set of UL TRI and UL TPMI, or both, the UE 1115 reports the difference between RI/CRI/PMI for the second set of UL TRI or UL TPMI, or both and RI/CRI/PMI(s) for the first set of UL TRI/TPMI, respectively. The association between reference signal resource for channel measurement and reference signal for self-interfering channel estimation can be introduced in addition to association between reference signal resource for channel measurement and CSI-IM for interference measurement/estimation.

At 1160, after receiving FD CSI feedback sent in 1150 with self-interference emulation from the UE 1115, BS #1 1105 schedules FD transmissions utilizing the reported DL RI/CQI/PMI and corresponding UL TRI or UL TPMI, or both. The scheduling may include the base station selecting a preferred transmission method based on the one or more CSI reports received by the base station. For example, if there are multiple FD CSI based on multiple emulated UL TRI or UL TPMI, or both, values received from the UE 1115, once BS #1 1105 makes the selection, the BS #1 1105 may notify the UE 1115 the UL TRI or UL TPMI, or both corresponding to the selected CSI report, as part of scheduling information for FD transmission, where FD includes the UE 1115 receiving from a first base station and transmitting to a second base station at the same time. At 1167, the BS #1 1105 sends the scheduling information to the UE 1115. Alternatively, the generation of scheduling information and transmission of the scheduling information to the UE 1115 can originate with BS #2 1110.

The UE 1115 may be receiving 1170 DL data from BS #1 1105 and transmitting 1175 UL data to BS #2 1110 as part of the FD capability of UE 1115, according to the scheduling information 1167.

The base station mentioned in this invention, while generally described as being a terrestrial base station, can also be considered to be a satellite, or a vehicle, or a balloon or a high-altitude pseudo-satellite (HAPS) carrying a base station or a UE. The UE mentioned in this invention, while generally described as being a terrestrial UE, can also be considered to be a satellite, or a vehicle, or a balloon or a high-altitude pseudo-satellite (HAPS) carrying a base station or a UE.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method for use by a user equipment (UE) side device comprising:
receiving configuration information comprising an identification of at least one reference signal to be used for determining full-duplex channel state information (FD CSI) and providing information regarding reporting FD CSI;
receiving the at least one reference signal to be used for determining FD CSI according to the configuration information;
determining FD CSI resulting from the received at least one reference signal for FD CSI from a base station, wherein reception of the at least one reference signal is affected by uplink (UL) transmission interference from the UE side device with at least one assumed UL pre-coding scheme, where the UL transmission interference is derived based on at least one reference signal for self-interfering channel estimation, which is associated with the at least one reference signal for FD CSI and the UL pre-coding scheme assumed by the UE side device, and wherein the at least one assumed UL pre-coding scheme is a particular uplink (UL) transmit rank indicator (TRI) applied onto a self-interfering channel obtained from the at least one reference signal for self-interfering channel estimation; and
transmitting information pertaining to the FD CSI according to the information regarding reporting FD CSI.

2. The method of claim 1 further comprising:
receiving scheduling information, which includes the UL TRI and UL transmit precoding matrix indicator (TPMI); and
performing an FD transmission based on the received scheduling information.

3. The method of claim 1, wherein each of the at least one reference signal for FD CSI identified in the received configuration information corresponds to a separate network node or a separate beam, the method further comprising:
transmitting a reference signal for FD CSI resource indicator that enables identifying a preferred network node or beam for DL reception in FD mode.

4. The method of claim 1, wherein the identification of the at least one reference signal for FD CSI comprises at least one of:
identification of a CSI-RS associated with a reference signal of the at least one reference signal for self-interfering channel estimation;
identification of a set of CSI-RS associated with a reference signal of the at least one reference signal for self-interfering channel estimation;
identification of a CSI-RS associated with a set of reference signals of the at least one reference signal for self-interfering channel estimation; or
identification of at least one set of CSI-RS associated with a set of reference signals of the at least one reference signal for self-interfering channel estimation.

5. The method of claim 1, wherein the determining the FD CSI is performed wherein the at least one assumed UL pre-coding scheme also includes:
a particular UL transmit precoding matrix indicator (TPMI) applied onto a self-interfering channel obtained from the at least one reference signal for self-interfering channel estimation.

6. The method of claim 1 wherein the transmitting the information pertaining to the FD CSI includes transmitting at least one of:
rank indicator (RI);
channel quality indicator (CQI);
precoding matrix indicator (PMI);
at least one UL TRI value used to determine the FD CSI; or
at least one UL TPMI value used to determine the FD CSI.

7. The method of claim 5, wherein the determining the FD CSI is performed for multiple UL TRI and UL TPMI resulting in multiple FD CSIs corresponding to respective UL TRI and UL TPMI values.

8. An apparatus comprising:
a processor coupled with a computer-readable medium, wherein the computer-readable medium having stored thereon computer executable instructions, that when executed cause the apparatus to:
receive configuration information comprising an identification of at least one reference signal to be used for determining full-duplex channel state information (FD CSI) and providing information regarding reporting FD CSI;
receive the at least one reference signal to be used for determining FD CSI according to the configuration information;
determine FD CSI resulting from the received at least one reference signal for FD CSI from a base station, wherein reception of the at least one reference signal is affected by uplink (UL) transmission interference from the apparatus with at least one assumed UL pre-coding scheme, where the UL transmission interference is derived based on at least one reference signal for self-interfering channel estimation, which is associated with the at least one reference signal for FD CSI and the UL pre-coding scheme assumed by the apparatus, and wherein the at least one assumed UL pre-coding scheme is a particular uplink (UL) transmit rank indicator (TRI) applied onto a self-interfering channel obtained from the at least one reference signal for self-interfering channel estimation; and
transmit information pertaining to the FD CSI according to the information regarding reporting FD CSI.

9. The apparatus of claim 8, wherein the computer executable instructions when executed further cause the apparatus to:
receive scheduling information, which includes the UL TRI and UL transmit precoding matrix indicator (TPMI); and
perform an FD transmission based on the received scheduling information.

10. The apparatus of claim 8, wherein each of the at least one reference signal for FD CSI identified in the received configuration information corresponds to a separate network node or a separate beam, and the computer executable instructions when executed further cause the apparatus to:
transmit a reference signal for FD CSI resource indicator that enables identifying a preferred network node or beam for DL reception in FD mode.

11. A method for use at a network side device comprising:
transmitting configuration information comprising an identification of at least one reference signal to be used for determining full-duplex channel state information (FD CSI) and providing information regarding reporting FD CSI;

transmitting the at least one reference signal to be used for determining FD CSI according to the configuration information; and receiving information, from a user equipment (UE), pertaining to FD CSI resulting from the at least one reference signal for FD CSI received at the UE when affected by uplink (UL) transmission interference with at least one assumed UL pre-coding scheme, where the UL transmission interference is derived based on at least one reference signal for self-interfering channel estimation, which is associated with the at least one reference signal for FD CSI and the UL pre-coding scheme assumed at the UE, and wherein the at least one assumed UL pre-coding scheme is a particular uplink (UL) transmit rank indicator (TRI) applied onto a self-interfering channel obtained from the at least one reference signal for self-interfering channel estimation.

12. The method of claim 11 further comprising:

transmitting scheduling information, which includes the UL TRI and UL transmit precoding matrix indicator (TPMI); and performing an FD transmission based on the scheduling information.

13. The method of claim 11, wherein each of the at least one reference signal for FD CSI identified in the transmitted configuration information corresponds to a separate network node or a separate beam, the method further comprising:

receiving a reference signal for FD CSI resource indicator that enables identifying a preferred network node or beam for DL reception in FD mode.

14. The method of claim 11, wherein the identification of the at least one reference signal for FD CSI comprises at least one of:

identification of a CSI-RS associated with a reference signal of the at least one reference signal for self-interfering channel estimation;

identification of a set of CSI-RS associated with a reference signal of the at least one reference signal for self-interfering channel estimation;

identification of a CSI-RS associated with a set of reference signals of the at least one reference signal for self-interfering channel estimation; or identification of at least one set of CSI-RS associated with a set of reference signals of the at least one reference signal for self-interfering channel estimation.

15. The method of claim 11, wherein the receiving the information pertaining to the FD CSI includes receiving at least one of:

rank indicator (RI);
channel quality indicator (CQI);
precoding matrix indicator (PMI);
at least one UL TRI value used to determine a respective FD CSI; or
at least one UL TPMI value used to determine a respective FD CSI.

16. The method of claim 11, wherein the received information pertaining to the FD CSI comprises a particular UL TRI or a particular UL TPMI.

17. The method of claim 16, wherein the information pertaining to the FD CSI comprises multiple UL TRI and UL TPMI resulting in multiple FD CSIs corresponding to respective UL TRI and UL TPMI values.

18. An apparatus comprising:

a processor coupled with a computer-readable medium, wherein the computer-readable medium having stored thereon computer executable instructions, that when executed cause the apparatus to:

transmit configuration information comprising an identification of at least one reference signal to be used for determining full-duplex channel state information (FD CSI) and providing information regarding reporting FD CSI;

transmit the at least one reference signal to be used for determining FD CSI according to the configuration information; and receive information, from a user equipment (UE), pertaining to FD CSI resulting from the at least one reference signal for FD CSI when affected by uplink (UL) transmission interference with at least one assumed UL pre-coding scheme, where the UL transmission interference is derived based on at least one reference signal for self-interfering channel estimation, which is associated with the at least one reference signal for FD CSI and the UL pre-coding scheme assumed at the UE, and wherein the at least one assumed UL pre-coding scheme is a particular uplink (UL) transmit rank indicator (TRI) applied onto a self-interfering channel obtained from the at least one reference signal for self-interfering channel estimation.

19. The apparatus of claim 18, wherein the computer executable instructions when executed further cause the apparatus to:

transmit scheduling information, which includes the UL TRI and UL transmit precoding matrix indicator (TPMI); and perform an FD transmission based on the scheduling information.

20. The apparatus of claim 18, wherein each of the at last one reference signal for FD CSI identified in the transmitted configuration information corresponds to a separate network node or a separate beam, and the computer executable instructions when executed further cause the apparatus to:

receive a reference signal for FD CSI resource indicator identifying a preferred network node or beam for DL reception in FD mode.

* * * * *